United States Patent
Tong et al.

(10) Patent No.: US 10,014,529 B2
(45) Date of Patent: *Jul. 3, 2018

(54) TRIPLE CONDUCTING CATHODE MATERIAL FOR INTERMEDIATE TEMPERATURE PROTONIC CERAMIC ELECTROCHEMICAL DEVICES

(71) Applicant: Colorado School of Mines, Golden, CO (US)

(72) Inventors: Jianhua Tong, Golden, CO (US); Ryan Patrick O'Hayre, Golden, CO (US); Meng Shang, Urbana, IL (US); Chuancheng Duan, Lakewood, CO (US)

(73) Assignee: Colorado School of Mines, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,027

(22) Filed: Jan. 8, 2016

(65) Prior Publication Data

US 2016/0204444 A1    Jul. 14, 2016

Related U.S. Application Data

(60) Provisional application No. 62/101,285, filed on Jan. 8, 2015.

(51) Int. Cl.
| | |
|---|---|
| *H01M 4/90* | (2006.01) |
| *H01M 8/12* | (2016.01) |
| *H01M 8/10* | (2016.01) |
| *H01M 4/86* | (2006.01) |
| *H01M 4/88* | (2006.01) |
| *H01M 8/1253* | (2016.01) |
| *H01M 8/124* | (2016.01) |
| *H01M 8/126* | (2016.01) |

(52) U.S. Cl.
CPC ....... *H01M 4/8621* (2013.01); *H01M 4/8889* (2013.01); *H01M 4/9033* (2013.01); *H01M 4/9075* (2013.01); *H01M 4/9066* (2013.01); *H01M 8/126* (2013.01); *H01M 8/1253* (2013.01); *H01M 2008/1293* (2013.01); *H01M 2300/0074* (2013.01); *H01M 2300/0077* (2013.01); *Y02E 60/525* (2013.01); *Y02P 70/56* (2015.11)

(58) Field of Classification Search
CPC . H01M 2008/1293; H01M 2300/0074; H01M 2300/0077; H01M 4/8889; H01M 4/9033; H01M 4/9066; H01M 8/1253; H01M 8/126; H01M 4/8621; H01M 4/9075; H01M 8/1246

See application file for complete search history.

(56) References Cited

PUBLICATIONS

M. Shang, J. Tong and R. O'Hayre. A promising cathode for intermediate temperature protonic ceramic fuel cells: BaCo0.4Fe0.4Zr0.2O3-δ, RSC Advances, 2013, 3,15769-15775.*

Shao et al., "A High-Performance Cathode for the Next Generation of Solid-Oxide Fuel Cells," Nature, 2004, vol. 431, pp. 170-173, 1 page, abstract only.

Cervera et al., "Structural study and proton transport of bulk nanograined Y-doped BaZrO3 oxide protonics materials," Solid State Ionics, 2008, vol. 179(7-8), pp. 236-242, 1 page, abstract only.

Cook et al., "On the systematic selection of perovskite solid electrolytes for intermediate temperature fuel cells," Solid State Ionics, 1991, vol. 45(3-4), pp. 311-321, 2 pages, abstract only.

Cook et al., "Perovskite Solid Electrolytes for Intermediate Temperature Solid Oxide Fuel Cells," Journal of the Electrochemical Society, 1900, vol. 137(10), pp. 3309-3310.

Diethelm et al., "Improved stability of La0.5Sr0.5FeO3 by Ta-doping for oxygen separation membrane application," Solid State Ionics, 2009, vol. 180(11-13), pp. 857-860, 1 page, abstract only.

Ding et al., "Electrochemical performance of BaZr0.1Ce0.7Y0.1Yb0.1O3-δ electrolyte based proton-conducting SOFC solid oxide fuel cell with layered perovskite PrBaCo2O5+δ cathode," Journal of Power Sources, 2011, vol. 196, pp. 2602-2607.

Haworth et al., "Yttrium doped BSCF membranes for oxygen separation," Separation and Purification Technology, 2011, vol. 81(1), pp. 88-93, 1 page, abstract only.

U.S. Appl. No. 14/621,091, filed Jan. 12, 2015, Tong.

Islam et al., "Doping and defect association in AZrO3 (A=Ca, Ba) and LaMO3 (M=Sc, Ga) perovskite-type ionic conductors," Dalton Transactions, 2004, pp. 3061-3066.

Kreuer, "Proton-Conducting Oxides," Annu. Rev. Mater. Res., 2003, vol. 33, pp. 333-359, 1 page, abstract only.

Li et al., "Synthesis and electrical properties of Co-doped Y0.08Sr0.92TiO3-δ as a potential SOFC anode," Solid State Ionics, 2008, vol. 179(27-32), pp. 1588-1592, 1 page, abstract only.

Li et al., "Synthesis and properties of Y-doped SrTiO3 as an anode material for SOFCs," Journal of Power Sources, 2007, vol. 166(1), pp. 47-52.

Liang et al., "Effect of various dopants on the tunable and dielectric properties of Ba0.6Sr0.4TiO3 ceramics," Ceramics International, 2005, vol. 31(8), pp. 1097-1101, 1 page, abstract only.

(Continued)

*Primary Examiner* — Carlos Barcena
(74) *Attorney, Agent, or Firm* — Sheridan Ross P.C.

(57) ABSTRACT

The present invention relates to a protonic ceramic fuel cell, a cathode for a protonic ceramic fuel cell, and a method of making the same. More specifically, the cathode for a protonic ceramic fuel cell utilizes a phase-pure perovskite structure of the compound $BaCo_{0.4}Fe_{0.4}Zr_{0.2-x}Y_xO_{3-\delta}$, where x is between about 0 and about 0.2. The cathode material may then be utilized in a PCFC as either a thin film porous cathode or as nanoparticles infiltrated into a cathode bone having a different structure.

20 Claims, 16 Drawing Sheets

(56) References Cited

PUBLICATIONS

Martynczuk et al., "Aluminum-Doped Perovskites As High-Performance Oxygen Permeation Materials," Chem. Mater., 2009, vol. 21(8), pp. 1586-1594, 2 pages, abstract only.

Nikodemski et al., "Solid-state reactive sintering mechanism for proton conducting ceramics," Solid State Ionics, 2013, vol. 253, pp. 201-210, 1 page, abstract only.

Sammells et al., "Rational selection of advanced solid electrolytes for intermediate temperature fuel cells," Solid state Ionics, 1992, vol. 52(1-3), pp. 111-123, 2 pages, abstract only.

Shang et al., "A promising cathode for intermediate temperature protonic ceramic fuel cells: $BaCo_{0.4}Fe_{0.4}Zr_{0.2}O_{3-\delta}$," RSC Advances, 2013, 3(36), pp. 15769-15775, 2 pages, abstract only.

Shang et al., "The Design and Realization of a Cost-Effective Approach for Protonic Ceramic Fuel Cells," The Royal Society of Chemistry, 2012, pp. 1-5.

Suksamai et al., "Measurement of proton and oxide ion fluxes in a working Y-doped $BaCeO_3$ SOFC," Solid State Ionics, 2007, vol. 178(7-10), pp. 627-634, 1 page, abstract only.

Tong et al., "Cost-effective solid-state reactive sintering method for high conductivity proton conducting yttrium-doped barium zirconium ceramics," Solid State Ionics, 2010, vol. 181(11-12), pp. 496-503, 1 page, abstract only.

Tong et al., "Proton-conducting yttrium-doped barium cerate ceramics synthesized by a cost-effective solid-state reactive sintering method," Solid State Ionics, 2010, vol. 181(33-34), pp. 1486-1498, 1 page, abstract only.

Tong et al., "Solid-state reactive sintering mechanism for large-grained yttrium-doped barium zirconate proton conducting ceramics," Journal of Materials Chemistry, 2010, vol. 20(30), pp. 6333-6341.

Ullmann et al., "Estimation of effective ionic radii in highly defective perovskite-type oxides from experimental data," Journal of Alloys and Compounds, 2001, vol. 316, pp. 153-158.

Wilson et al., "Quantitative three-dimensional microstructure of a solid oxide fuel cell cathode," Electrochemistry Communications, 2009, vol. 11(5), pp. 1052-1056, 1 page, abstract only.

Yang, et al., "A Novel Composite Cathode for Low-Temperature SOFCs Based on Oxide Proton Conductors," Advanced Materials, 2008, vol. 20, pp. 3280-3283.

Yang et al., "Enhanced Sulfur and Coking Tolerance of a Mixed Ion Conductor for SOFCs: $BaZr_{0.1}Ce_{0.7}Y_{0.2-x}Yb_xO_{3-\delta}$," Science, 2009, vol. 326(5949), pp. 126-129, 1 page, abstract only.

Zhang et al., "Double-site yttria-doped $Sr_{1-x}Y_xCo_{1-y}Y_yO_{3-\delta}$ perovskite oxides as oxygen semi-permeable membranes," Journal of Alloys and Compounds, 2009, vol. 474, pp. 477-483.

Zhang et al., "Effect of Y and Nb codoping on the microstructure and electrical properties of lead zirconate titanate ceramics," Solid State Ionics, 2004, vol. 166(1-2), pp. 219-223, 1 page, abstract only.

Zhao et al., "Investigation of Mixed Conductor $BaCo_{0.7}Fe_{0.3-x}Y_xO_{3-\delta}$ with High Oxygen Permeability," Journal of Physical Chemistry C, 2010, vol. 114(41), pp. 17975-17981, 1 page, abstract only.

Zhi et al., "Incorporation of yttrium in barium titanate ceramics," Journal of the American Ceramic Society, 1999, vol. 82(5), pp. 1345-1348.

\* cited by examiner

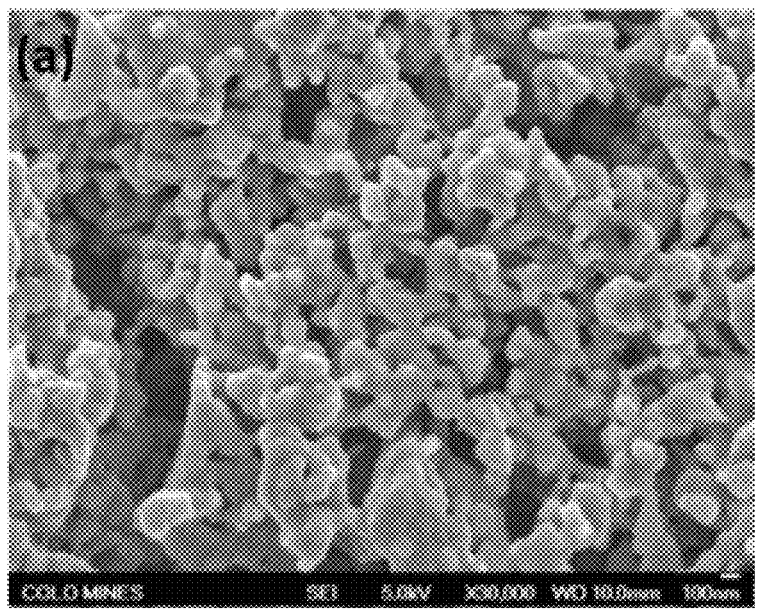
Fig. 5(a)
Fig. 5(b)
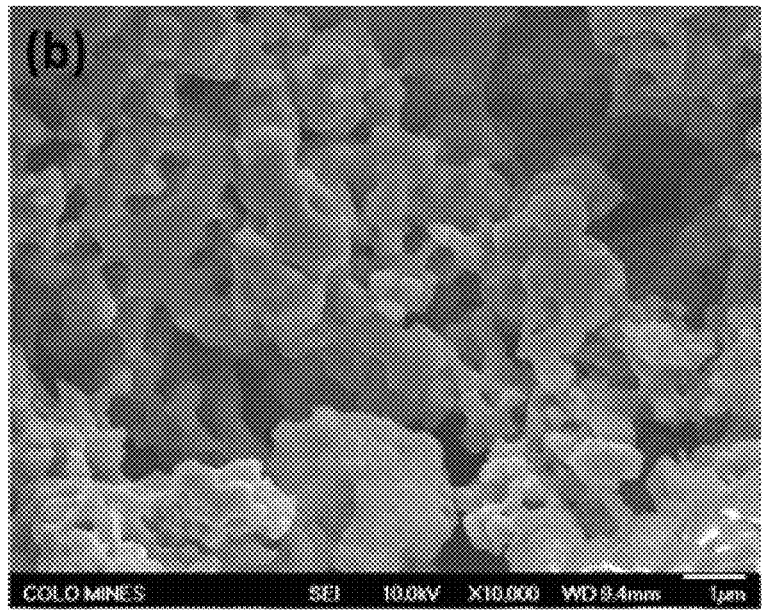

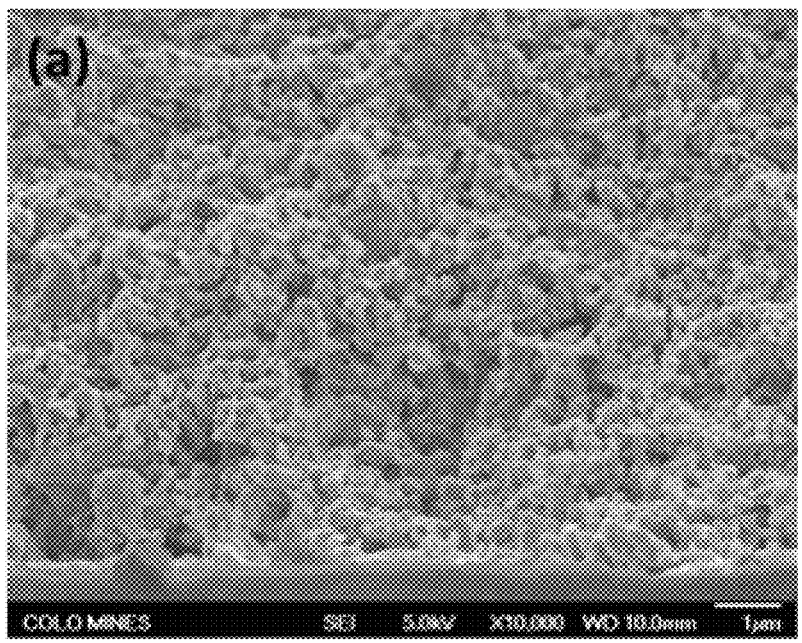
Fig. 7(a)
Fig. 7(b)
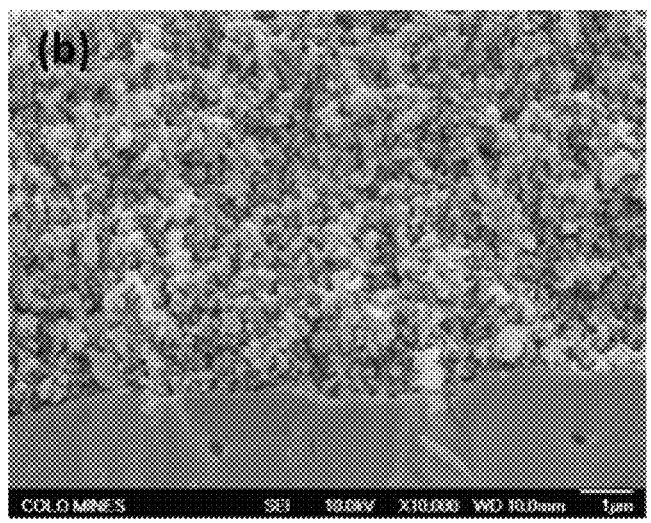

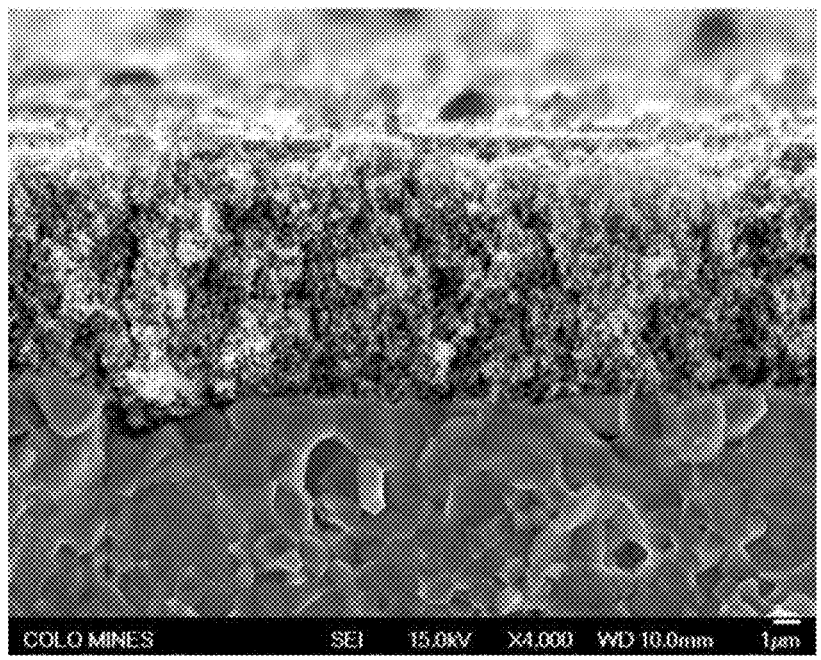
Fig. 11(a)
Fig. 11(b)
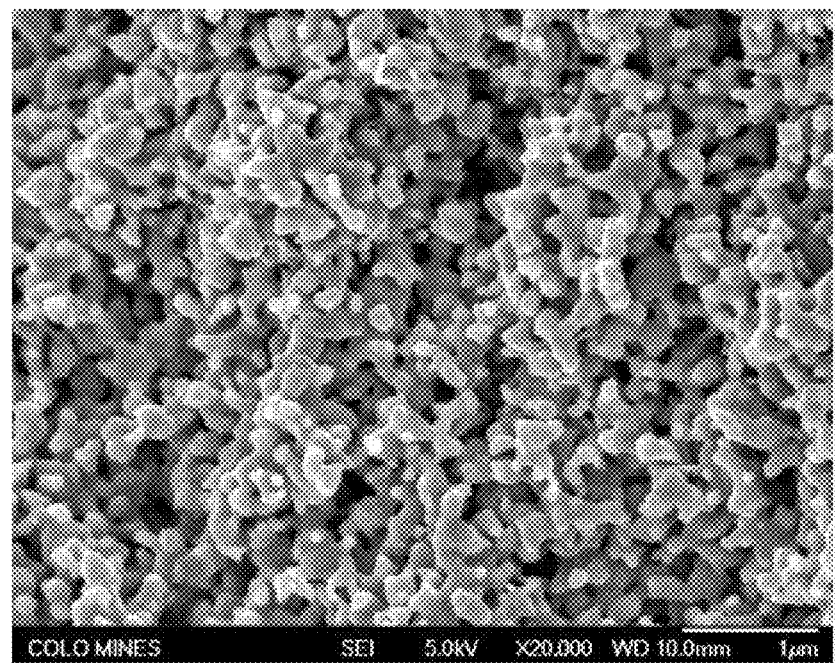

TRIPLE CONDUCTING CATHODE MATERIAL FOR INTERMEDIATE TEMPERATURE PROTONIC CERAMIC ELECTROCHEMICAL DEVICES

CROSS REFERENCE TO RELATED APPLICATIONS

This application claims priority under 35 U.S.C. § 119(e) to U.S. Provisional Application Ser. No. 62/101,285, filed Jan. 8, 2015, which is incorporated herein in its entirety by reference.

GOVERNMENT LICENSE RIGHTS

This invention was made with government support under grant DE-AR0000493 awarded by the U.S. Department of Energy. The government has certain rights in the invention.

TECHNICAL FIELD

This invention relates to the field of protonic ceramic electrochemical devices and, more specifically, to a cathode material for use in an intermediate temperature protonic ceramic fuel cell. The invention also relates to methods for producing protonic ceramic fuel cells.

BACKGROUND

The following text should not be construed as an admission of knowledge in the prior art. Furthermore, citation or identification of any document in this application is not an admission that such document is available as prior art to the present invention, or that any reference forms a part of the common knowledge in the art.

Proton conducting fuel cells (PCFCs), and other intermediate temperature protonic ceramic electrochemical devices (IT-PCECDs) exhibit several advantages over traditional solid oxide fuel cells (SOFCs) in terms of lower operation temperature (300° C.-600° C.) and higher efficiency. Among proton conducting ceramics, the recently reported proton conductor $BaCe_{0.7}Zr_{0.1}Y_{0.1}Yb_{0.1}O_{3-\delta}$ (BCZYYb) has shown particularly promising performance in single-cell fuel cell demonstrations at test temperatures around 750° C. However, the maximum power density of the PCFCs achieved (~1100 mW/cm² and at 750° C.) was much lower than that of SOFCs.

Very few promising performances for PCFCs at temperatures lower than 600° C. have been reported. One of the challenges for the development of high performance, intermediate temperature PCFCs lies in the discovery of appropriate cathode materials. The poor performance of most PCFCs is attributed, in part, to the use of cathodes that were developed for SOFCs operating at much higher temperatures of between about 700° C. to 1000° C. where as the target PCFC operation temperatures are near 500° C. One reason for this is that the application of conventional SOFC cathodes, which are based on either electron-conducting oxides or mixed oxygen ion and electron-conducting oxides, to electrolytes developed for PCFCs restricts the cathode reaction only to points where the electrolyte phases meet.

Although mixed oxygen ion and electron conducting oxides and proton conducting oxides have been researched extensively, none have been promising. For example, although yttrium-doped barium zirconates (BZY) are excellent proton conductors and also exhibit some oxygen-ion conductivity in dry reducing atmospheres, its electronic conductivity is extremely small. However, it is unquestionable that a prerequisite for a promising intermediate temperature PCFC is high electronic conductivity. Similarly, while $BaCo_{0.4}Fe_{0.4}Zr_{0.2}O_{3-\delta}$ (BCFZ) provides a strong electrochemical performance and has stability, making it compatible with BCZYYb electrolytes, the oxygen ion transport in the cathode limits the cells performance.

Accordingly, there exists a need in the art for an intermediate temperature PCFC having a high electronic conductivity, high oxygen ion transport, and compatibility with PCFC electrolytes.

SUMMARY

In view of the limitations now present in the prior art cathodes for PCFCs and other IT-PCECD's, the present invention provides a new and novel cathode which has improved oxygen ion transport properties and electrical conductivity over know prior art cathodes, and methods for making the cathode and PCFCs containing the cathode.

The present invention relates to a triple conducting (oxygen ion, proton, and electron) perovskite-type oxide, which is a promising cathode material for oxygen reduction reactions for PCFCs. The area specific resistance of this cathode material in symmetrical cells is lower than 0.15 $\Omega cm^2$ with gold as the current collector at 750° C. in wet air, which is much better than currently available cathodes. A single protonic ceramic fuel cell constructed from this cathode with a BCZYYb electrolyte and BCZYYb—Ni anode demonstrated a power density of 584 mW/cm² at 600° C. and 1273 mW/cm² at 750° C.

The oxygen reduction reaction (ORR) kinetic is very low for IT-PCECDs such as PCFCs and protonic ceramic electrolysis cells (PCECs), which greatly hindered the practical application of IT-PCECDs. The disclosed perovskite-type multi-component compound showed triple (oxygen ion, proton, and electron) conductivities under wet oxidizing atmospheres, resulting in high ORR performance at intermediate temperature (300° C.-750° C.). This new ORR catalyst can even be expanded to the low temperature electrochemical devices such as electrocatalysts for alkaline fuel cell, air metal batteries, etc.

An aspect of the present invention is a cathode for use in a protonic ceramic fuel cell. A further aspect of the present invention is a cathode for use in a protonic ceramic fuel cell, the cathode including $BaCo_{0.4}Fe_{0.4}Zr_{0.2-x}Y_xO_{3-\delta}$.

Another aspect of the present invention is a protonic ceramic fuel cell having a cathode including $BaCo_{0.4}Fe_{0.4}Zr_{0.2-x}Y_xO_{3-\delta}$, an electrolyte, and an anode.

Yet another aspect of the present invention is a method of fabricating a protonic ceramic fuel cell, having the steps of depositing a precursor electrolyte layer on at least a portion of an anode, depositing a precursor cathode layer on at least a surface of the precursor electrolyte layer to form a structure, and heating the structure to between about 1200° C. and about 1600° C. for between about 5 hours and about 25 hours to form the protonic ceramic fuel cell including an anode layer, an electrolyte layer, and a cathode layer including $BaCo_{0.4}Fe_{0.4}Zr_{0.2-x}Y_xO_{3-\delta}$.

BRIEF DESCRIPTION OF THE DRAWINGS

FIG. 5(a)-(b) are SEM images of the cross-section of a BCFZ cathode layer and $BaCo_{0.4}Fe_{0.4}Zr_{0.1}Y_{0.1}O_{3-\delta}$ cathode layer, respectively;

FIGS. 7(a)-(b) are SEM images of the cross-section of the resulting cathode layer for BCFZ and optimized $BaCo_{0.4}Fe_{0.4}Zr_{0.1}Y_{0.1}O_{3-\delta}$, respectively;

FIGS. 11(a)-(b) are images showing the interface between BZY20+1.4 wt % CuO electrolyte and $BaCo_{0.4}Fe_{0.4}Zr_{0.1}Y_{0.1}O_{3-\delta}$ thin film cathode layer and a high magnification view of the cathode layer for a PCFC single cell of 45 wt % BZY20+55 wt % NiO|BZY20+1.4 wt % CuO|$BaCo_{0.4}Fe_{0.4}Zr_{0.1}Y_{0.1}O_{3-\delta}$ after 1400 hours of operation under $CH_4$/air;

DESCRIPTION OF EMBODIMENTS

Figure 1A:
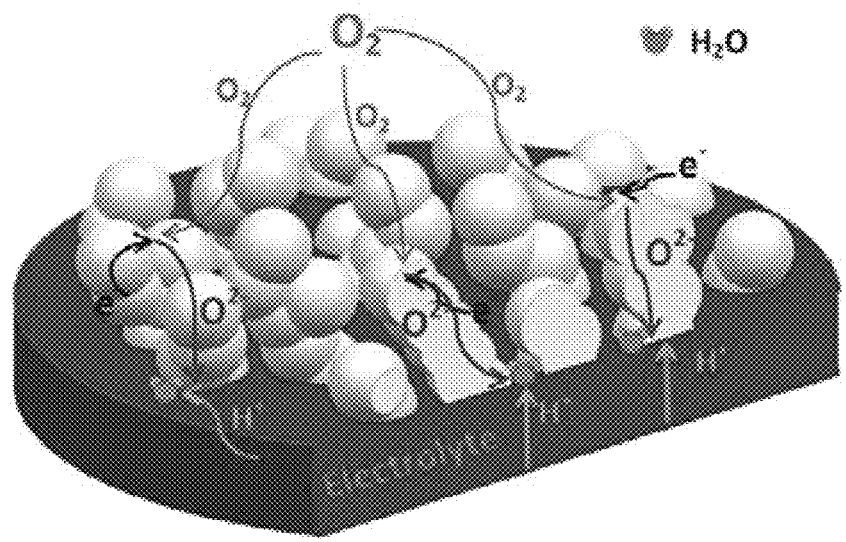
FIGS. 1(a)-(b) are schematics of the oxygen reduction reaction mechanism for a PCFC with a mixed ionic and electronic cathode and a triple conducting oxide cathode, respectively.

The present invention relates to cathodes for use in a PCFC, a PCFC containing the novel cathode, and methods of fabricating the same.

As provided herein, the abbreviations as used within this patent application have the following meanings:

"BCFZY" means $BaCo_{0.4}Fe_{0.4}Zr_{0.2-x}Y_xO_{3-\delta}$.

"BCFZY$_{0.1}$" means $BaCo_{0.4}Fe_{0.4}Zr_{0.1}Y_{0.1}O_{3-\delta}$.

"BCZYYb" means $BaCe_{0.7}Zr_{0.1}Y_{0.1}Yb_{0.1}O_{3-\delta}$ or precursor solid mixture of $BaCO_3$, $CeO_2$, $ZrO_2$, $Y_2O_3$, and $Yb_2O_3$ according to the formula of $BaCe_{0.7}Zr_{0.1}Y_{0.1}Yb_{0.1}O_{3-\delta}$.

"BCFZ" means $BaCo_{0.4}Fe_{0.4}Zr_{0.2}O_{3-\delta}$ or precursor solution of mixed $Ba(NO_3)_2$, $Ce(NO_3)_3$, $Co(NO_3)_2$, $Fe(NO_3)_3$, and $ZrO(NO_3)_2$ according to the formula of $BaCo_{0.4}Fe_{0.4}Zr_{0.2}O_{3-\delta}$.

"BCZY63" means $BaCe_{0.6}Zr_{0.3}Y_{0.1}O_{3-\delta}$ or precursor solid mixture of $BaCO_3$, $CeO_2$, $ZrO_2$, and $Y_2O_3$ according to the formula of $BaCe_{0.6}Zr_{0.3}Y_{0.1}O_{3-\delta}$.

"BZY" refers generally to yttrium-doped barium zirconates.

"BZY20" means $BaZr_{0.8}Y_{0.2}O_{3-\delta}$ or precursor solid mixture of $BaCO_3$, $ZrO_2$, and $Y_2O_3$ according to the formula of $BaZr_{0.8}Y_{0.2}O_{3-\delta}$.

"BSFZ" means $Ba_{0.5}Sr_{0.5}Fe_{0.8}Zn_{0.2}O_{3-\delta}$.

"IT-PCECD" means intermediate temperature protonic ceramic electrochemical devices.

"ORR" means oxygen reduction reaction.

"PCEC" means protonic ceramic electrolysis cell.

"PCFC" means protonic ceramic fuel cell.

"SOFC" means solid oxide fuel cell.

The following detailed description illustrates the invention by way of example and not by way of limitation. This description will clearly enable one skilled in the art to make and use the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An aspect of the present invention is a cathode for use in a protonic ceramic fuel cell. A further aspect of the present invention is a cathode for use in a protonic ceramic fuel cell, the cathode including $BaCo_{0.4}Fe_{0.4}Zr_{0.2-x}Y_xO_{3-\delta}$.

Without wishing to be bound to any theory, it is believed that the partial substitution of yttrium for zirconium improves the thermal and chemical stability of the cubic perovskite structure, tailors the oxygen vacancy concentration, and increases ionic conductivity. Furthermore, from a structural viewpoint, crystals with a large lattice parameter usually have a large free volume, making them favorable for the migration of oxygen ions. Accordingly, by introducing $Y^{3+}$, an amphoteric dopant ion, into the perovskite structure, either at the A-site or B-site, various performances can be increased. For example, by inserting $Y^{3+}$ at the A-site, it can be used as a donor dopant and enhance the electrical conductivity, while also acting as a sintering dopant and promoting densification during sintering. At the B-site, it is used as an acceptor dopant to create oxygen vacancies as charge compensation, thus producing the oxygen ionic or protonic conductivity.

Further, in the mixed conducting materials, the weak B—O—B bond is favored because it will lead to easier transportation of oxygen ions. Thus, when doped at the B-site, the large size of $Y^{3+}$ ($r_{CN=6}$=0.90 Å) helps to stabilize the cubic structure of the systems with t>1 down to room temperature by making the tolerance factor approach 1.0.

In one embodiment of the present invention, the cathode has a phase-pure perovskite structure. In another embodiment of the present invention, the value of x is between about 0 and about 0.2. More preferably, the value of x is 0.1. In another embodiment of the present invention, the value of δ is about 0 to about 0.3. In yet another embodiment of the present invention, the cathode is a porous thin film cathode. In another embodiment, the cathode includes a cathode bone of a formula $BaCe_{0.6}Zr_{0.3}Y_{0.1}O_{3-\delta}$. In a further embodiment, the $BaCo_{0.4}Fe_{0.4}Zr_{0.1}Y_{0.1}O_{3-\delta}$ is a plurality of nanoparticles and the plurality of nanoparticles are deposited on at least one wall of the cathode bone.

Another aspect of the present invention is a protonic ceramic fuel cell. A further aspect of the present invention is a protonic ceramic fuel cell having a cathode including $BaCo_{0.4}Fe_{0.4}Zr_{0.2-x}Y_xO_{3-\delta}$, an electrolyte, and an anode.

In one embodiment of the present invention, the cathode of the protonic ceramic fuel cell has an x value of about 0 to about 0.2. More preferably, the cathode has an x value of 0.1. In another embodiment of the present invention, the value of δ in the cathode material is about 0 to about 0.3. In another embodiment of the present invention, the electrolyte of the protonic ceramic fuel cell is at least one of $BaCe_{0.7}Zr_{0.1}Y_{0.1}Yb_{0.1}O_{3-\delta}$-1.0 wt % NiO, $BaCe_{0.7}Zr_{0.1}Yb_{0.1}O_{3-\delta}$-1.0 wt % CoO, $BaCe_{0.7}Zr_{0.1}Yb_{0.1}O_{3-\delta}$-1.0 wt % CuO, $BaCe_{0.7}Zr_{0.1}Y_{0.1}Yb_{0.1}O_{3-\delta}$-1.0 wt % ZnO, $BaZr_{0.8}Y_{0.2}O_{3-\delta}$-1.0 wt % NiO, $BaZr_{0.8}Y_{0.2}O_{3-\delta}$-1.4 wt % CuO, $BaZr_{0.8}Y_{0.2}O_{3-\delta}$-1.0 wt % CoO, $BaZr_{0.8}Y_{0.2}O_{3-\delta}$-1.0 wt % ZnO, $BaCe_{0.6}Zr_{0.3}Y_{0.1}O_{3-\delta}$-1.3 wt % CuO, $BaCe_{0.6}Zr_{0.3}Y_{0.1}O_{3-\delta}$-1.0 wt % NiO, $BaCe_{0.6}Zr_{0.3}Y_{0.1}O_{3-\delta}$-1.0 wt % CoO, $BaCe_{0.6}Zr_{0.3}Y_{0.1}O_{3-\delta}$-1.0 wt % ZnO, $BaCe_{0.8}Y_{0.2}O_{3-\delta}$-1.0 wt % CoO, $BaCe_{0.8}Y_{0.2}O_{3-\delta}$-1.0 wt % NiO, $BaCe_{0.8}Y_{0.2}O_{3-\delta}$-1.0 wt % ZnO, and $BaCe_{0.8}Y_{0.2}O_{3-\delta}$-1.0 wt % CuO. In yet another embodiment of the present invention, the anode of the protonic ceramic fuel cell is at least one of $BaCe_{0.7}Zr_{0.1}Y_{0.1}Yb_{0.1}O_{3-\delta}$—Ni, $BaZr_{0.8}Y_{0.2}O_{3-\delta}$—Ni, $BaCe_{0.6}Zr_{0.3}Y_{0.1}O_{3-\delta}$—Ni, and $BaCe_{0.8}Y_{0.2}O_{3-\delta}$—Ni. In yet another embodiment of the present invention, the cathode of the protonic fuel cell is a porous thin film cathode. In another embodiment, the cathode of the protonic fuel cell further includes a cathode bone of a formula of $BaCe_{0.6}Zr_{0.3}Y_{0.1}O_{3-\delta}$. In a further embodiment, the $BaCo_{0.4}Fe_{0.4}Zr_{0.1}Y_{0.1}O_{3-\delta}$ is a plurality of nanoparticles and the plurality of nanoparticles are deposited on at least one wall of the cathode bone. In yet another embodiment of the present invention, the cathode has a phase-pure perovskite structure.

Yet another aspect of the present invention is a method of fabricating a protonic ceramic fuel cell. A further aspect of the present invention is a method of fabricating protonic ceramic fuel cell, having the steps of depositing a precursor electrolyte late on at least a portion of an anode, depositing a precursor cathode layer on at least a surface of the precursor electrolyte layer to form a structure, and heating the structure to about 1200° C.-1600° C. for about 5 hours to about 25 hours to form the protonic ceramic fuel cell including an anode layer, an electrolyte layer, and a cathode layer including $BaCo_{0.4}Fe_{0.4}Zr_{0.2-x}Y_xO_{3-\delta}$.

In other embodiments of the present invention, the cathode layer has a thickness of between about 5 and about 70 microns. In another embodiment of the present invention, the value of x in the cathode material is between about 0 and about 0.2. More preferably, the value of x is 0.1. In yet another embodiment of the present invention, the anode layer is at least one of $BaCe_{0.7}Zr_{0.1}Y_{0.1}Yb_{0.1}O_{3-\delta}$—Ni, $BaZr_{0.8}Y_{0.2}O_{3-\delta}$—Ni, $BaCe_{0.6}Zr_{0.3}Y_{0.1}O_{3-\delta}$—Ni, and $BaCe_{0.8}Y_{0.2}O_{3-\delta}$—Ni, and the electrolyte layer is at least one of $BaCe_{0.7}Zr_{0.1}Y_{0.1}Yb_{0.1}O_{3-\delta}$-1.0 wt % NiO, $BaCe_{0.7}Zr_{0.1}Y_{0.1}Yb_{0.1}O_{3-\delta}$-1.0 wt % CoO, $BaCe_{0.7}Zr_{0.1}Y_{0.1}Yb_{0.1}O_{3-\delta}$-1.0 wt % CuO, $BaCe_{0.7}Zr_{0.1}Y_{0.1}Yb_{0.1}O_{3-\delta}$-1.0 wt % ZnO, $BaZr_{0.8}Y_{0.2}O_{3-\delta}$-1.0 wt % NiO, $BaZr_{0.8}Y_{0.2}O_{3-\delta}$-1.4 wt % CuO, $BaZr_{0.8}Y_{0.2}O_{3-\delta}$-1.0 wt % CoO, $BaZr_{0.8}Y_{0.2}O_{3-\delta}$-1.0 wt % ZnO, $BaCe_{0.6}Zr_{0.3}Y_{0.1}O_{3-\delta}$-1.3 wt % CuO, $BaCe_{0.6}Zr_{0.3}Y_{0.1}O_{3-\delta}$-1.0 wt % NiO, $BaCe_{0.6}Zr_{0.3}Y_{0.1}O_{3-\delta}$-1.0 wt % CoO, $BaCe_{0.6}Zr_{0.3}Y_{0.1}O_{3-\delta}$-1.0 wt % ZnO, $BaCe_{0.8}Y_{0.2}O_{3-\delta}$-1.0 wt % CoO, $BaCe_{0.8}Y_{0.2}O_{3-\delta}$-1.0 wt % NiO, $BaCe_{0.8}Y_{0.2}O_{3-\delta}$-1.0 wt % ZnO, and $BaCe_{0.8}Y_{0.2}O_{3-\delta}$-1.0 wt % CuO.

Figure 1B:
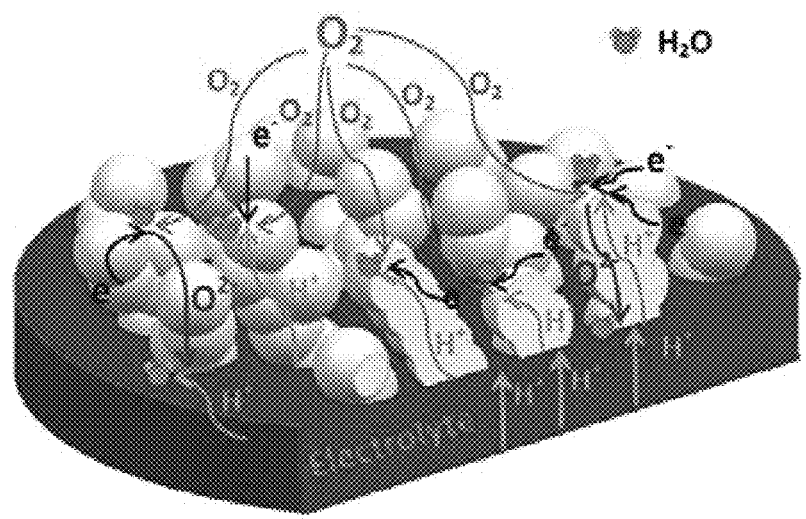

Referring now to the Figures, FIGS. 1(a)-(b) shows schematic diagrams of a cathode of the prior art and cathode of the present invention. More specifically, FIGS. 1(a)-(b) shows the oxygen reduction mechanism for a PCFC between (a) a mixed ionic and electronic (MIEC) cathode (conventional SOFC cathode) and (b) a triple (electron, oxygen ion, and proton) conducting oxide cathode of the present invention. Without wishing to be bound to any theory, it is believed the poor performance of the conventional PCFC devices are attributed, in part, to their use of cathodes that were developed for SOFCs operating at much higher temperatures (i.e., 700° C. to 1000° C.), whereas target PCFC operation temperatures are lower (i.e., ~500° C.).

As shown in FIG. 1, the application of the conventional SOFC cathodes, which are often based on either electron-conducting oxides or mixed oxygen ion and electron-conducting oxides, to PCFC electrolytes restricts the cathode reaction to points where the electrolyte and electrode phases meet. By contrast, the triple-conducting oxide cathode eliminates the triple-phase boundary constraints associated with traditional composite cathode architectures. As a result, the entire cathode becomes electrochemically active, offering the chance to lower the viable operating window of PCFC devices to <400° C., compared to conventional devices with a viable operating window of >700° C.

All publications, patents, and patent documents cited herein are incorporated by reference herein, as though individually incorporated by reference. The invention has been described with reference to various specific and preferred embodiments and techniques. However, it should be understood that many variations and modifications may be made while remaining within the spirit and scope of the invention.

It is appreciated that certain features of the invention, which are, for clarity, described in the context of separate embodiments, may also be provided in combination in a single embodiment. Conversely, various features of the invention that are, for brevity, described in the context of a single embodiment, may also be provided separately or in any sub-combination.

This invention now being generally described will be more readily understood by reference to the following examples, which are included merely for the purposes of illustration of certain aspects of the embodiments of the invention. The examples are not intended to limit the invention, as one of skill in the art would recognize from the above teachings and the following examples that other techniques and methods can satisfy the claims and can be employed without departing from the scope of the claimed invention.

EXAMPLES

Example 1: Characterization of Cathode

Preparation of Cathode Powder

Powders of BCFZY were synthesized from nitrates of the component metals via a method of combining EDTA acid and citric complexes. In brief, the calculated amounts of nitrates were dissolved in EDTA-$NH_3H_2O$ ($NH_3H_2O$, 8 mol L$^{-1}$; EDTA: NH$_3$H$_2$O=1 g, 10 ml) solution under heating and stirring. Citric acid was then introduced with a molar ratio of EDTA acid:citric acid:total metal ions controlled to be around 1.5:1.5:1. Subsequently, NH$_3$H$_2$O or HNO$_3$ was added to adjust the pH value to around 9, immediately making the solution transparent. By evaporating the water, a dark purple gel was obtained. The gel was then heated to high temperature to burn in order to get the primary powder, which was then calcined at 1000° C. for 5 hours to obtain a final phase-pure powder of the desired composition.

Powders of BCFZY$_{0.1}$ were also synthesized by the traditional sol-gel method without burn, but brought the gel to 150° C. for 24 hours to get the primary powder, which was then calcined at 1000° C. for five hours to obtain a final phase-pure powder of the desired composition. For the optimized procedure, powders of BCFZY$_{0.1}$ were first synthesized by the traditional sol-gel method. The powder is then brought to 150° C. for 24 hours before being ball milled with butanol as a solvent for 48 hours. Then, the powder was dried at 90° C. for 24 hours. Finally, the powder is calcined at 600° C. for five hours to obtain a final powder, which will be used in a slurry.

Preparation of Cathode Solution

To prepare the active BCFZY$_{0.1}$ cathode coating, stoichiometric amounts of the respective metal nitrates (0.05 mol total metal ion concentration) are dissolved in 90 mL deionized water. Then, 0.75 mol of citric acid is added as a complexing agent to facilitate the homogeneous distribution of the componential metal ions. In order to improve the solubility of precursors, 10 mL 25 wt. % NH$_3$.H$_2$O is added. Typically, 10 µL of this BCFZY$_{0.1}$ solution is infiltrated into the pores of the cathode bone structure under vacuum using a microliter syringe to control the loading amount. The infiltrated cells are fired at 400° C. for 1 h. The above process is repeated two more times and finally the cells are sintered at 900° C. for 5 h to obtain the desired nano crystalline phase of BCFZY$_{0.1}$.

Preparation of Cathode Pellet for TGA Measurement

The as-synthesized sol-gel BCFZY$_{0.1}$ powder was calcined at 900° C. for 10 h then pressed into pellets in a carbonized stainless steel die set with diameter of 12.5 mm using 375 MPa for 120 s. The final dense pellets with diameter of about 9-11 mm and thickness of 0.5-1.0 mm were obtained after sintering at 1120° C. for 5 h.

TGA Experimental Protocol for Protonation and Deprotonation Measurement

The TGA experiments were carried out as follows: 1) Heat to 500° C. at 10° C.·min$^{-1}$ in a dry environment of 20 mL·min$^{-1}$ air and 83 mL·min$^{-1}$ UHP nitrogen. Final p$_{O2}$=4.3%/Final p$_{H2O}$=0.04% (dew point of −35° C.). 2) Hold in dry environment of 20 mL·min$^{-1}$ air and 83 mL·min$^{-1}$ UHP nitrogen for 33 minutes. The results of the TGA experiments will be discussed with reference to Example 2 and FIGS. 10(a)-(d).

Characterization Results

X-ray diffraction (XRD) analyses of the cathode powders were performed at room temperature using a Philips diffractometer (X'Pert Pro) with Cu-Kα radiation, tube voltage 45 kV, and tube current 40 mA. Intensities were collected in the 2 h range between 10° and 120° with a step size of 0.008° and a measuring time of 5 s at each step. The microstructure and chemical composition of the sintered pellets were investigated by means of Field Emission Scanning Electron Microscopy (FESEM, JEOL JSM7000F).

Figure 2A:
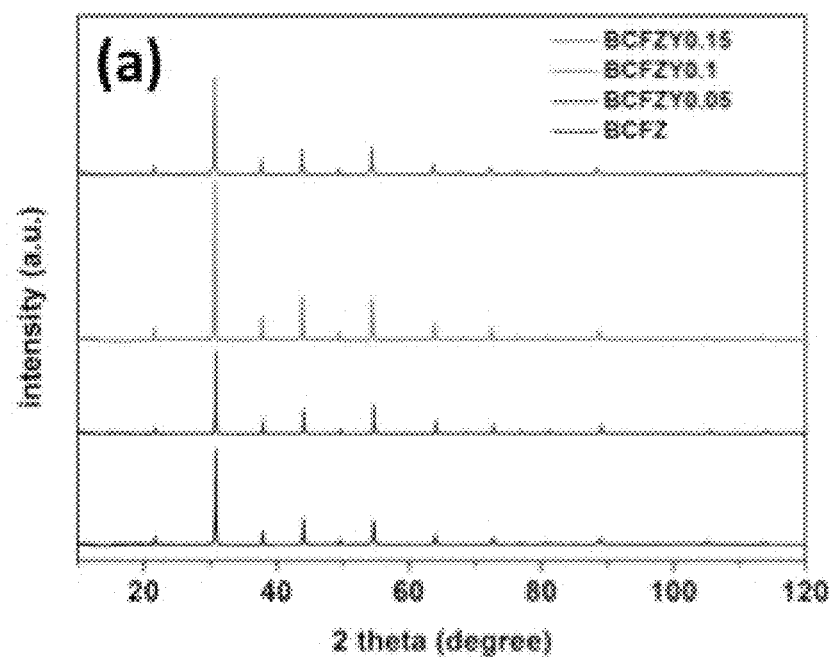
FIGS. 2(a)-(b) are plots of the XRD patterns of $BaCo_{0.4}Fe_{0.4}Zr_{0.2-x}Y_xO_{3-\delta}$ where x is between 0 and 0.15.
Figure 2B:
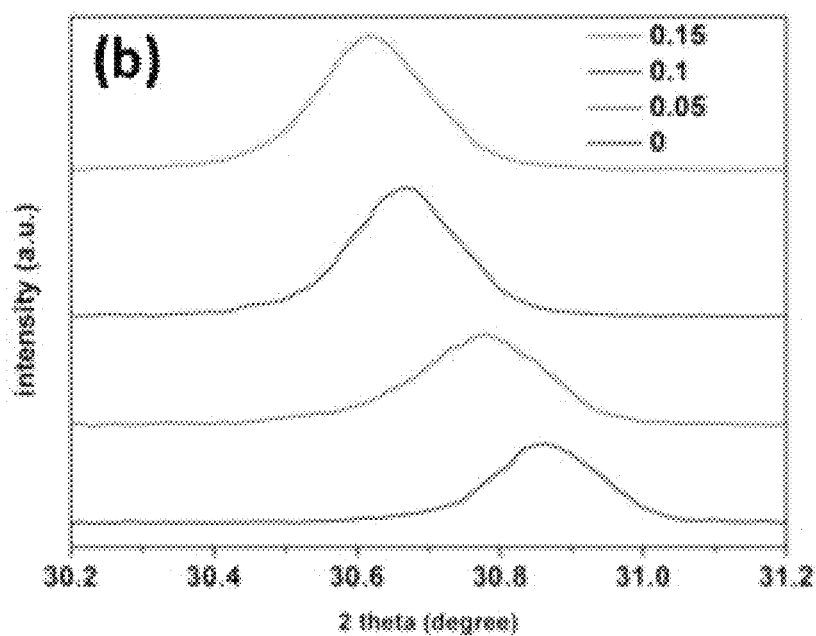

FIGS. 2(a) and 2(b) show XRD patterns of BCFZY having x values of 0, 0.05, 0.1, and 0.15, which were prepared by the sol-combustion method and calcined at 1000° C. for five hours. As shown in FIG. 2(a), a single cubic perovskite structure was formed for all samples, demonstrating that BCFZY can be stabilized to the cubic phase by B-site doping with Y lower than 15 mol %. For the compositions that retained the cubic perovskite structure, no impurities were detected beyond the baseline noise level, indicating a high level of crystalline phase purity. FIG. 2(b) shows an enlarged view of peaks present in the XRD pattern at around 30 degrees. As shown, the XRD peaks shift gradually to lower angles as the yttrium doping level increases from x=0 to x=0.15, indicating an increased lattice parameter with yttrium doping. This is understood by considering the larger size of yttrium ions ($^{VI}$r$_{Y3+}$=0.90 Å) compared to that of zirconate ions ($^{VI}$r$_{Zr4+}$=0.72 Å). Given the lack of impurities observed in the XRD patterns, even with larger amounts of yttrium doping, it seems likely that at least the majority of the yttrium has been incorporated into the perovskite structure.

Figure 3:
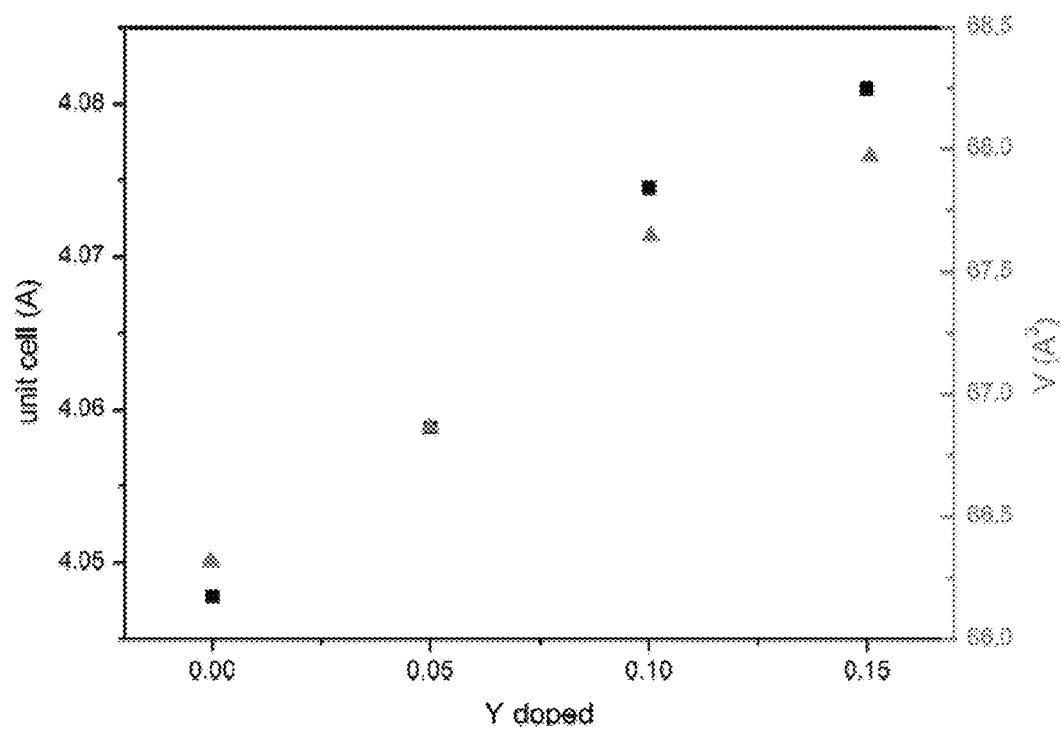
FIG. 3 is a plot the analysis of the lattice parameters between the yttrium content and an average unit cell size and volume of the $BaCo_{0.4}Fe_{0.4}Zr_{0.2-x}Y_xO_{3-\delta}$ crystals.

FIG. 3 shows an analysis of the lattice parameters between the yttrium content and an average unit cell size and volume of the crystals. As shown, an increasing linear correlation exists between the yttrium content and the average unit cell size of the crystals. Thus, the incorporation of yttrium, having a larger ionic radius, on the B-site would be expected to increase the average unite cell size and volume of the crystal, as observed.

Figure 4:
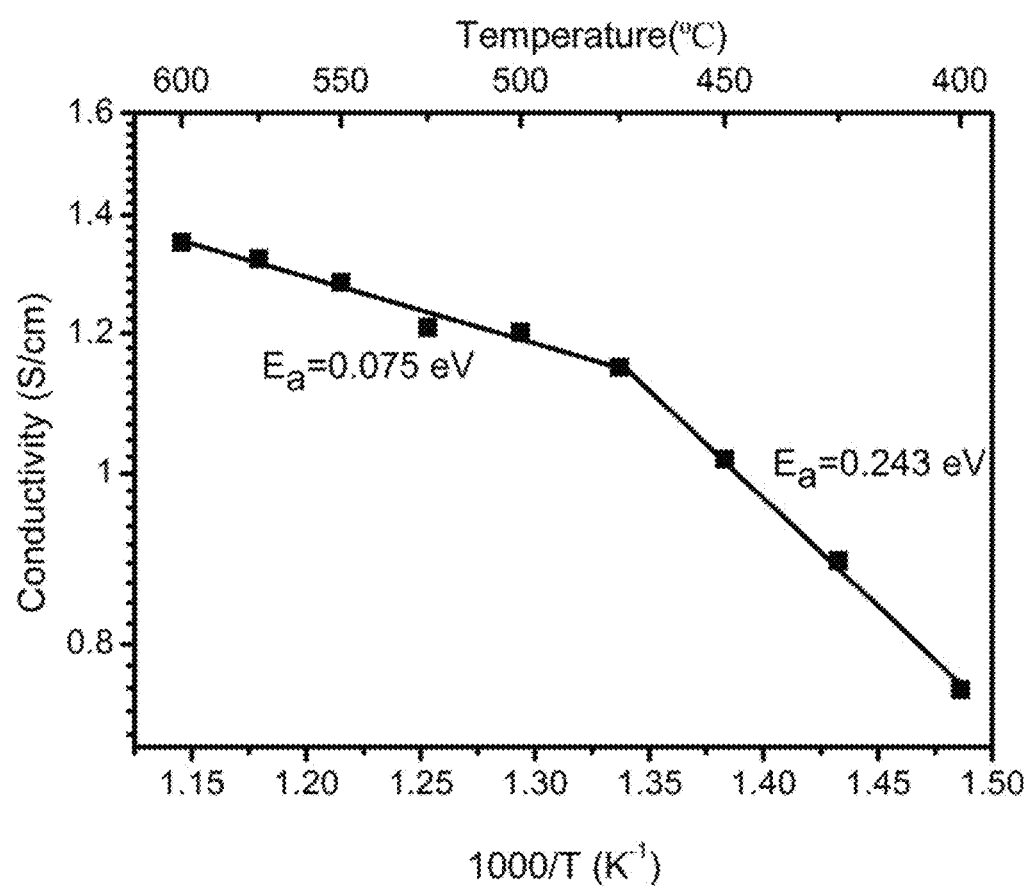
FIG. 4 is a plot the DC conductivity of $BaCo_{0.4}Fe_{0.4}Zr_{0.1}Y_{0.1}O_{3-\delta}$ in humidified air.

FIG. 4 shows the DC conductivity of BCFZY$_{0.1}$ in humidified air measured by the 4-probe DC measurement method. As shown, BCFZY$_{0.1}$ exhibits electrical conductivities in a range of 0.5-1.4 S·cm$^{-1}$ at temperatures between 400° C.-600° C. This range of electrical conductivities ensures the high performance of the cathode reaction. Moreover, the low activation energies of 0.075 eV and 0.243 eV indicate the large contribution made to electron conductivity.

Example 2: Symmetric Cells

Preparation of Cells

Symmetrical cells with the configuration of electrode|electrolyte|electrode were prepared as described below. Proton conducting ceramic pellets of BCZYYb were synthesized by the solid-state reactive sintering (SSRS) method from the cost-effective raw oxides. Dense BCZYYb-1.0 wt % NiO pellets of 15 mm in diameter and 2 mm in thickness were prepared by dry pressing under 375 MPa pressure for 120 s and were subsequently sintered in air at 1350° C. for 24 h. The BCFZY (burned and sol-gel) cathode powders (5 g) were first dispersed in a mixed solution of glycerol (3 mL), ethylene glycol (10 mL) and isopropyl alcohol (50 mL) to form a colloidal suspension via high-energy ball milling for 24 h. The obtained slurries were spray-coated symmetrically on both surfaces of the BCZYYb-1.0 wt % NiO pellets, followed by calcination at 1100° C. for 5 h in stagnant air. For the optimized BCFZY$_{0.1}$ cathode, the final calcination temperature is 950° C. Silver mesh and gold wire was attached to the electrode surfaces using gold paste as the current collector by sintering in air at 900° C. for 1 h.

Testing

Electrochemical impedance spectroscopy (EIS) of symmetrical cells was performed with a Gamry Reference 600 Potentiostat/Galvanostat/ZRA using a signal amplitude of 10 mV under open circuit voltage (OCV) conditions in the frequency range of 0.01-10$^6$ Hz. EIS was conducted under 21% O$_2$ by mixing oxygen with Ar using flow meters. The symmetrical cell tests were performed in wet atmospheres (P$_{(H2O)}$=0.03 atm).

Results

FIGS. 5(a) and 5(b) show SEM images of the cross sections for cathode films spray-coated on BCZYYb-1.0 wt % NiO electrolyte membrane after annealing at 1100° C. with BCFZ (FIG. 5a) and BCFZY$_{0.1}$ (FIG. 5b) as cathode materials. As shown, the microstructures of BCFZ and BCFZY$_{0.1}$ show a number of differences. As can be seen in FIG. 5a, BCFZ has a very porous morphology and nano-sized grains. By contrast, as shown in FIG. 5b, BCFZY$_{0.1}$ has a relatively dense morphology and larger grains.

Figure 6:
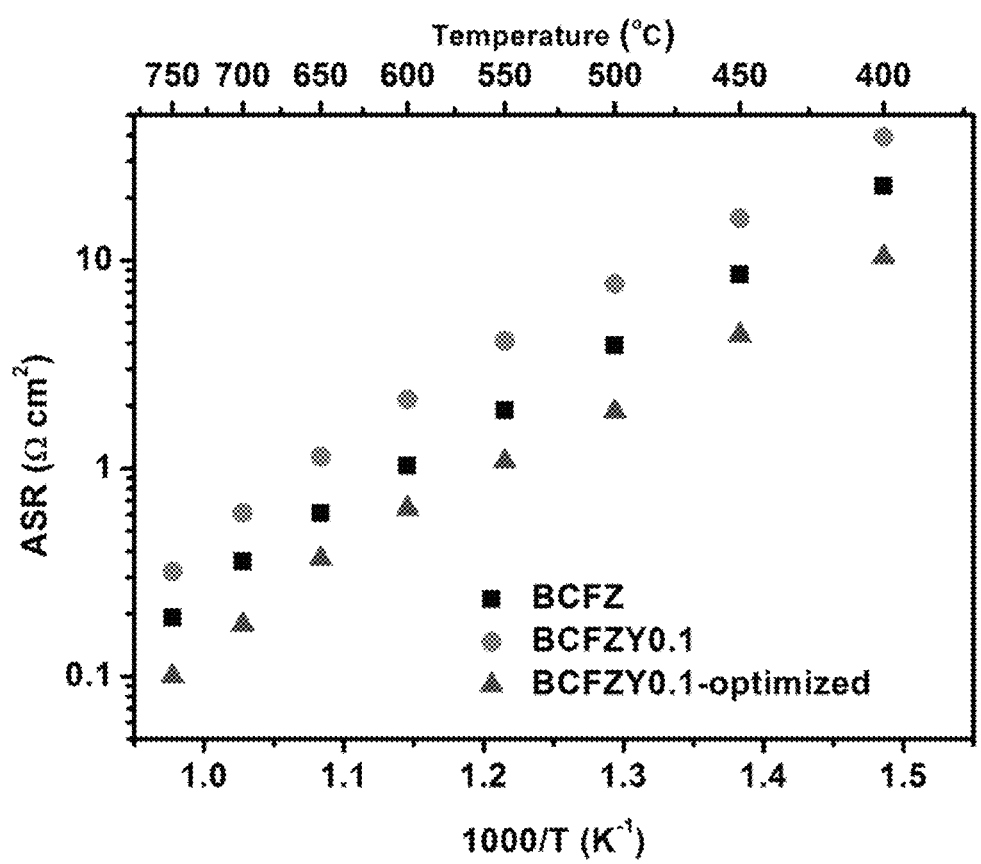
FIG. 6 is a plot of ASR values for the $BaCo_{0.4}Fe_{0.4}Zr_{0.1}Y_{0.1}O_{3-\delta}$ porous thin film cathode and BCFZ porous thin film cathode.

FIG. 6 shows ASR values for the BCFZY$_{0.1}$ and BCFZ porous thin film cathodes based on symmetric cells in Arrhenius plots as a function of temperature. As shown, the ASR for the BCFZY$_{0.1}$ cathode is higher than that of the BCFZ cathode. Without wishing to be bound to any theory, the larger ASR values for the BCFZY$_{0.1}$ as compared with the ASR values for BCFZ likely correlates to the difference in microstructure, namely, that BCFZY$_{0.1}$ is relatively dense and has larger grains than BCFZ.

FIGS. 7(a) and 7(b) show SEM images of the cross-section of the resulting BCFZ cathode layer and BCFZY$_{0.1}$ cathode layer, respectively. More specifically, FIG. 7(b) shows the BCFZY$_{0.1}$ cathode layer which was fabricated at an annealing temperature of 900° C. to obtain a similar morphology as the BCFZ morphology shown in FIG. 7(a). By comparing the ASRs for BCFZ and BCFZY$_{0.1}$ cathodes with the same morphology, it is demonstrated that the existence of yttrium greatly improves the cathode performance by lowering ASR and activation energy, which is consistent with predictions by structural analysis.

Figure 8A:
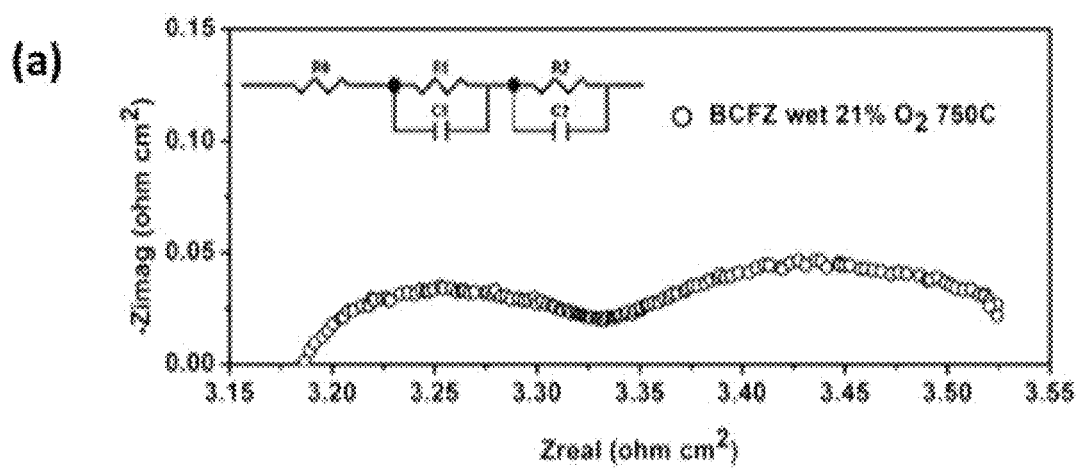
FIGS. 8(a)-(b) are plots of the typical impedance spectrum of a symmetrical cell with BCFZ and the optimized $BaCo_{0.4}Fe_{0.4}Zr_{0.1}Y_{0.1}O_{3-\delta}$, respectively.
Figure 8B:
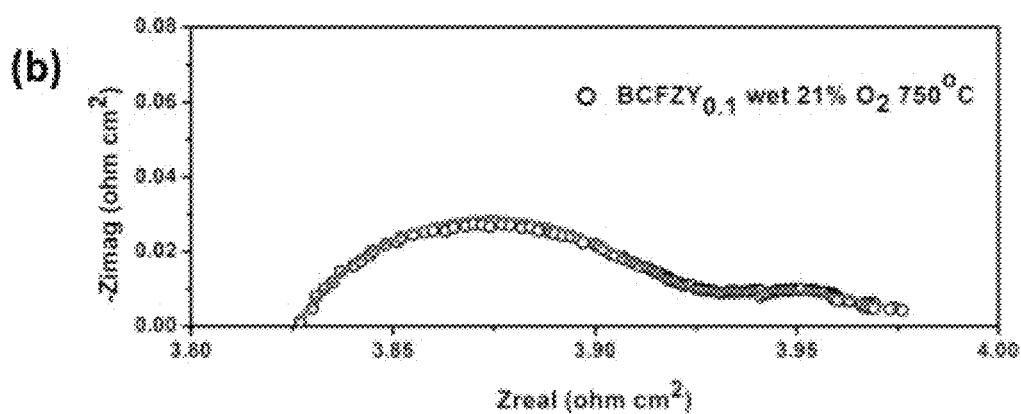

FIGS. 8(a) and 8(b) show the typical impedance spectrum at a temperature of 750° C. of a symmetrical cell with a BCFZ cathode (sintered at 1100° C.) and an optimized BCFZY$_{0.1}$ cathode. With respect to FIG. 8(a), the process related to R1 may originate from the proton diffusion at the interface between the BCFZ cathode and the BCZYYb electrolyte. The process related to R2 may originate from the diffusion of O$^-_{ad}$ (O$^-_{ad}$—O$^-_{TPB}$). By contrast, as shown in FIG. 8(b), the optimized BCFZY$_{0.1}$ cathode has a much smaller R2 resistance under the same analytical conditions, which demonstrates that the Y doping in the BCFZ structure could increase the size and volume of the structure leading to a further increase in oxygen vacancies and oxygen ionic transportation.

Figure 9:
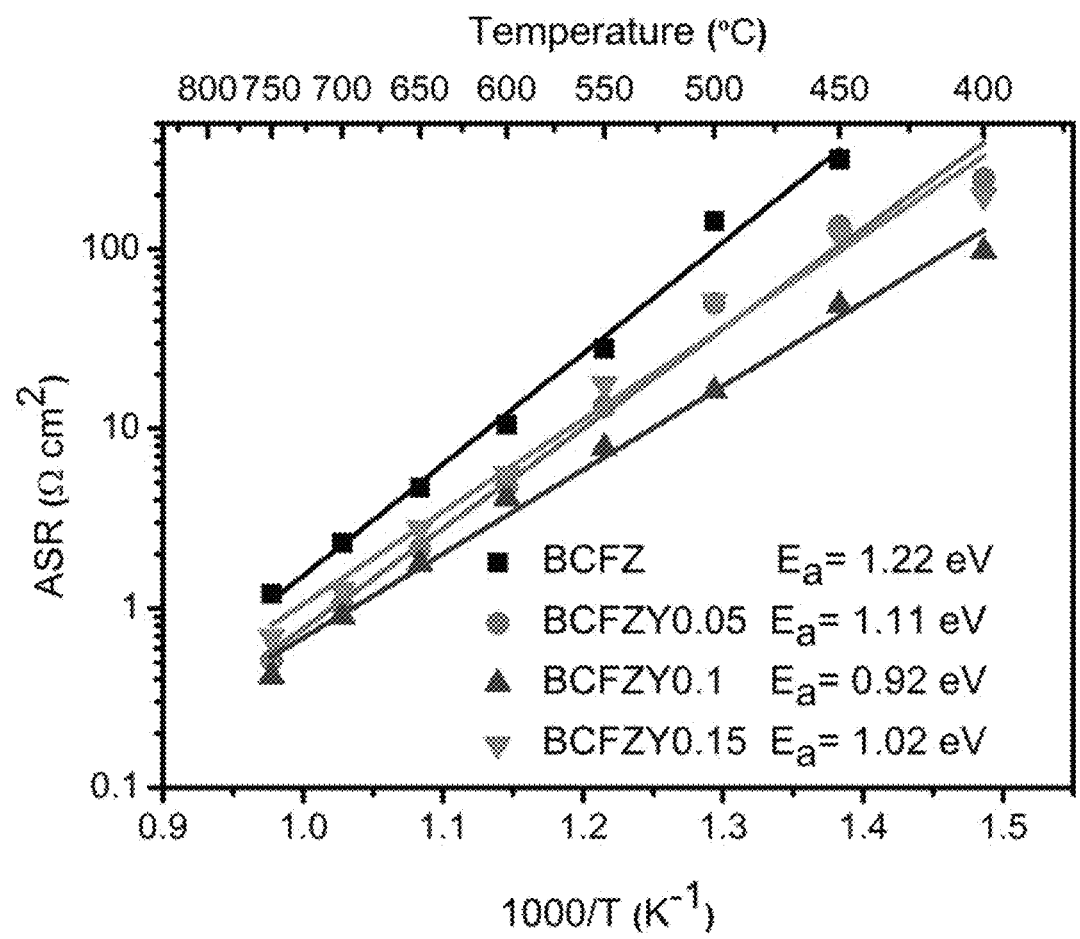
FIG. 9 is a plot of the cathode ASR values for a BCFZY|BCZYYb|BCFZY symmetric cell in an Arrhenius diagram as a function of temperature for various concentrations of yttrium doping.

After the porous thin film cathodes with equivalent microstructure were fabricated, the characterization of the intrinsic effect of yttrium amount in the perovskite structure was performed by measuring ASR values for symmetric cells based on the electrolyte of BCZYYb+1.0 wt % NiO and symmetric cathode of BaCo$_{0.4}$Fe$_{0.4}$Zr$_{0.2-x}$Y$_x$O$_{3-\delta}$ (x=0-0.15). FIG. 9 shows the cathode ASR values for a series of BCFZY symmetric cells (with varying Y-doping concentration) in an Arrhenius diagram as a function of temperature. The BCFZY$_{0.1}$ cathode yields the lowest ASR values (best performance). As temperature decreases, the ASR of all samples increases. Activation energies extracted from the cathode ASR data via the Arrhenius equation yield significantly lower values for the BCFZY$_{0.1}$ cathode compared to the other cathode compositions.

Figure 10A:
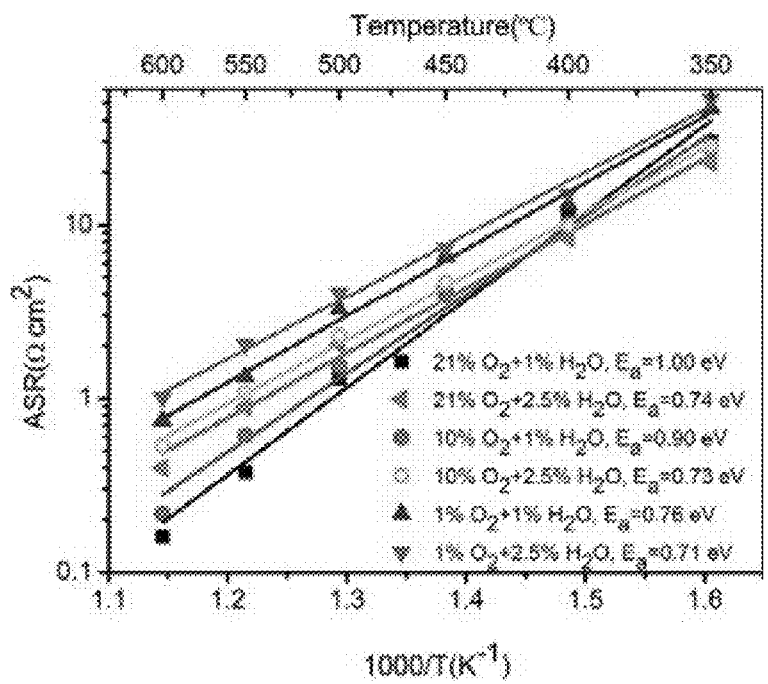
FIGS. 10(a)-(d) are plots showing the cathode ASR values for the optimized $BaCo_{0.4}Fe_{0.4}Zr_{0.1}Y_{0.1}O_{3-\delta}$ symmetric cell under various atmosphere, cathode 1/ASR values under various $P(O_2)$ at $P(H_2O)$=0.025 atm, cathode 1/ASR values under various $P(O_2)$ at $P(H_2O)$=0.01 atm, and cathode protonation and deprotonation profile measured by thermogravimetric analysis.
Figure 10B:
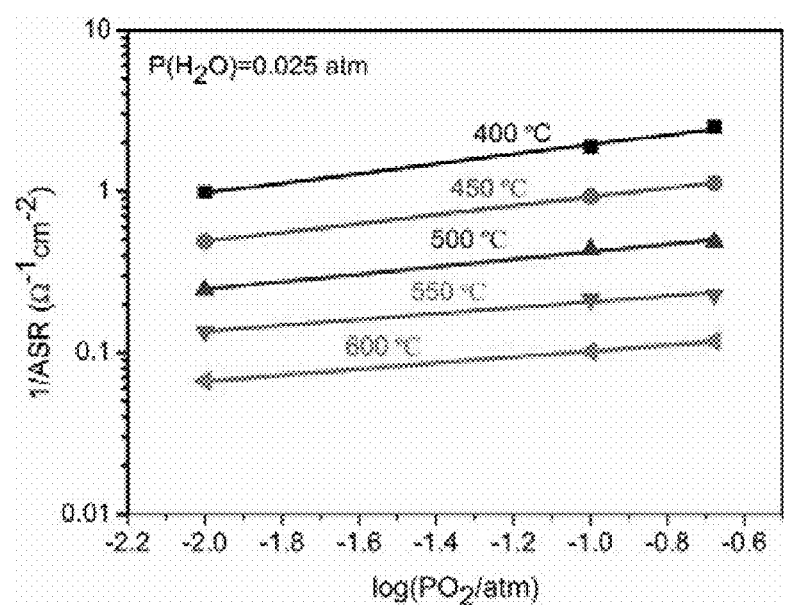
Figure 10C:
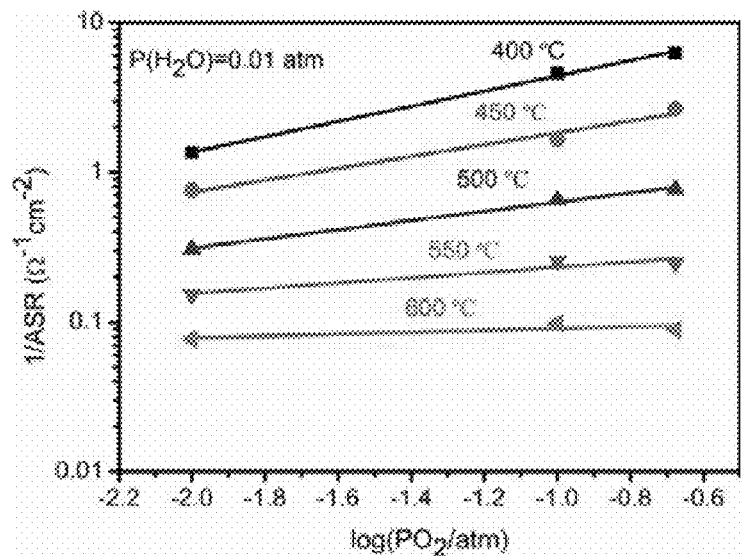
Figure 10D:
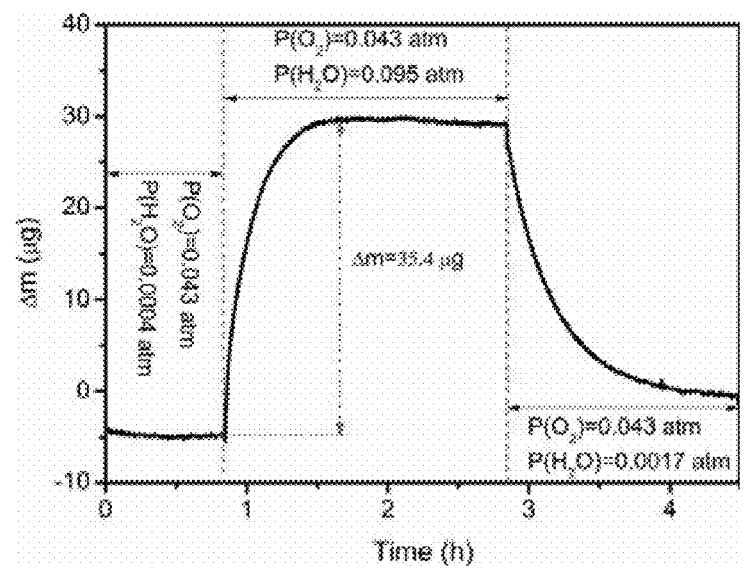

FIGS. 10(a)-10(c) are related to the ORR mechanism on representative BCFZY$_{0.1}$ cathode in symmetric cells. FIG. 10(a) shows the BCFZY$_{0.1}$ symmetric cell ASR under different atmospheres from 350° C. to 600° C. The activation energy increases with increasing oxygen partial pressure, but decreases with increasing water partial pressure, which is indirect evidence for proton conduction in BCFZY$_{0.1}$. FIGS. 10(b) and 10(c) show the cathode 1/ASR values under various p$_{O2}$ at p$_{H2O}$=0.025 atm and 0.01 atm, respectively. Standard defect reaction and mass action laws can be applied to describe the likely defect reaction equilibria in BCFZY. Using Kroger-Vink notation, proton uptake by water incorporation can be described via:

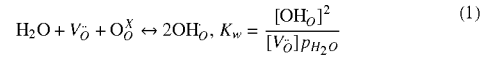

where K$_W$ is the equilibrium constant for water incorporation (Wagner hydration). Equation (2) thus describes the predicted variation in proton concentration as a function of K$_w$, the external p$_{H2O}$, and the oxygen vacancy concentration. For oxidation, we have:

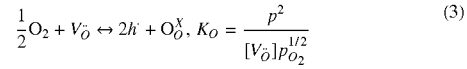

where K$_O$ is the equilibrium constant for the oxidation reaction. Equation (4) thus describes the variation in oxygen vacancy concentration as a function of K$_O$, the external P$_{O2}$, and the concentration of holes (which increase with increasing oxygen partial pressure at fixed temperature). For a majority hole conductor (such as BCFZY), σ$_{total}$ will be dominated by the hole conductivity, which as shown in Equation 4 is proportional to p$_{O_2}^{1/4}$ at constant water partial pressure.

FIGS. 10(b) and 10(c) further show 1/ASR vs log(p$_{O2}$), the slope of which may indicate a cathode reaction process limited by the hole-dominated conductivity of the cathode. Under wet conditions (p$_{H2O}$=0.025 atm), all curves are very close to ¼ slope, but under drier conditions (p$_{H2O}$=0.01 atm) the slope varies from almost zero at high-T to ~½ at low-T, potentially indicating a change in the rate-limiting reaction step with T under dry conditions.

However, the results of the ASR data provide only indirect evidence for proton uptake in BCFZY$_{0.1}$. Strong and direct evidence can be found by referring to the results of the TGA experiment performed in Example 1, shown in FIG. 10(d). As shown, upon a sudden stepwise increase in p$_{H2O}$ under constant p$_{O2}$, BCFZY$_{0.1}$ experiences an increase in mass. This mass change can be ascribed to either the hydration or hydrogenation reactions shown in equations 5 and 6 (or a combination of the two). Accordingly, these reactions give the low and high limits respectively to the likely proton uptake in BCFZY$_{0.1}$. Based on mass increase measured for BCFZY$_{0.1}$ in FIG. 10(d), the low and high proton concentration limits at 500° C. and 0.95% pH2O are calculated to be 0.21% mol H+/mol BCFZY$_{0.1}$ and 1.9% mol H$^+$/mol BCFZY$_{0.1}$, respectively.

Thus, the preliminary TGA study here confirms that BCFZY0.1 shows comparable, if not slightly higher proton uptake than the previously reported BSFZ triple conducting oxide. Considering the larger lattice constant of BCFZY$_{0.1}$ compared to BSFZ and the relatively symmetric cubic perovskite structure, it is likely that proton mobility will also be higher in BCFZY$_{0.1}$, consistent with the low activation energies for BCFZY$_{0.1}$ obtained from symmetric cell measurements in moist atmospheres.

Example 3: Anode-Supported PCFC Single Cells

Optimized cathode compositions of BCFZY$_{0.1}$ were applied as porous thin film cathode and active nanoparticle cathode in proton conducting cathode bone for button-type PCFC singles under H$_2$/air and CH$_4$/air gradients.

Preparation

Precursor pastes of the electrolyte and cathode bone were prepared by mixing 30 g of the respective powders with 6 g dispersant (20 wt. % solsperse 28000 (Lubrizol) dissolved in terpinol), and 2 g binder (5 wt. % V-006 (Heraeus) dissolved in terpinol). The anode precursor powder was dry-pressed under 375 MPa for 2 minutes in a circular carbon-aided steel die set with a diameter of 19 mm to produce green anode pellets (2 mm thick). A thin electrolyte precursor paste layer (15~50 μm after firing) was deposited on each side of the green anode pellets by screen-printing. (The electrolyte was applied to both sides of the cell to minimize asymmetric stress issues during sintering.) The cathode bone precursor paste layer (~10-50 μm thick after firing) was subsequently printed on top of one of the electrolyte precursor layers. The complete structure is fired at 1400° C. for 18 h. After firing, the extra electrolyte layer is removed by grinding and a complete single cell (porous anode|dense electrolyte|porous cathode bone) is obtained. In order to further improve cathode performance, active nanoparticles of the BCFZY phase were introduced by infiltration and subsequent heat treatment at 900° C. for 5 h.

The anode green pellets fabrication and electrolyte layer deposition method was analogous to the half SSRS method. This "half-cell" anode/electrolyte structure was then fired at 1400-1450° C. for 18 h. After firing, the extra (stress-compensating) electrolyte layer was removed by grinding and the active cathode (~10-20 μm thick) was printed on the electrolyte and the cell was fired at 900° C. for 5 h. After that, a complete single cell (porous anode|dense electrolyte|porous cathode) is obtained.

Testing

Once the anode-supported PCFC single cells were obtained, hydrogen-fueled and methane-fueled single cell testing was performed. Regarding the hydrogen-fueled testing, I-V polarization tests of the PCFC button cells (sealed onto an alumina tube and reduced under 5 vol. % H$_2$ for 24 h and 10 vol. % H$_2$ for another 24 h at 600° C.) were performed with 100 mL·min$^{-1}$ air and 20 mL·min$^{-1}$ hydrogen as oxidant and fuel respectively by a Gamry Reference 3000 over a range of temperatures from 350°-600° C.

Regarding the methane-fueled testing, all the PCFC button cells for testing in methane were infiltrated with a 10 μL 1.5 wt. % N4O10Ru (Ruthenium nitrosyl nitrate) solution into the porous anode prior to coating the cathode layer at 900° C. I-V polarization tests of all the cells were performed with 100 mL·min$^{-1}$ (STP) air as oxidant and 20 vol. % CH$_4$ (10 mL·min$^{-1}$)+30 vol. % Ar+50 vol. % H$_2$O or 28.6 vol. % CH$_4$ (5 mL·min$^{-1}$)+71.4 vol. % H$_2$O as fuel by a Gamry Reference 3000 over a range of temperatures from 350°-600° C.

Results

FIGS. 11(a)-(b) show SEM image for the interface between BZY20+1.4 wt % CuO electrolyte and BCFZY$_{0.1}$ thin film cathode layer and the SEM image of the high magnification view of the cathode layer for PCFC single cell of 45 wt % BZY20+55 wt % NiO|BZY20+1.4 wt % CuO|BCFZY$_{0.1}$ after 1400 h operation under CH$_4$/air. It is clear the very porous nanostructure with BCFZY$_{0.1}$ grain size less than 100 nm was maintained for more than 1400 h of operation, which indicates the great morphological stability of the cathode material.

Figure 12A:
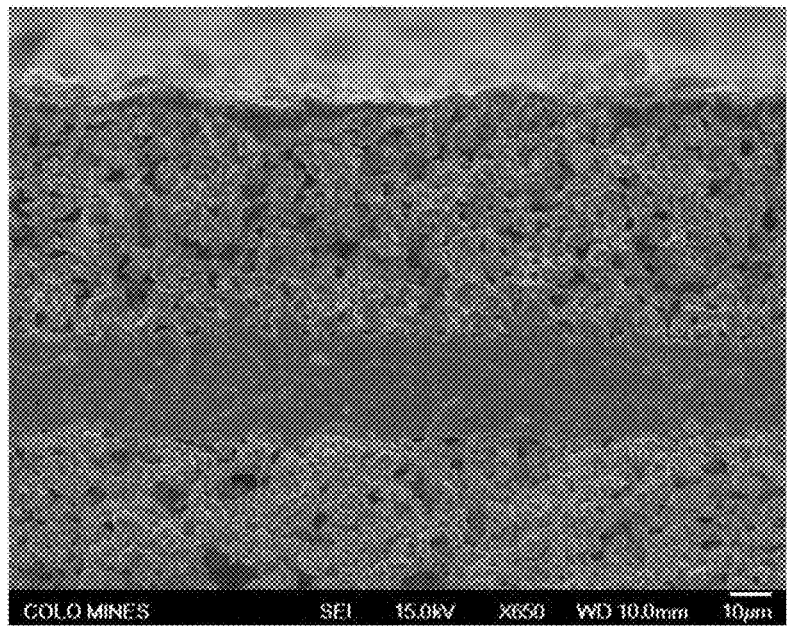
FIGS. 12(a)-(b) are images of a cross section and a high magnification image of a composite cathode microstructure fabricated by infiltration method for PCFC single cell of 45 wt % BCZYYb+55 wt % NiO|BCZYYb+1.0 wt % NiO|BCZY63+$BaCo_{0.4}Fe_{0.4}Zr_{0.1}Y_{0.1}O_{3-\delta}$.
Figure 12B:
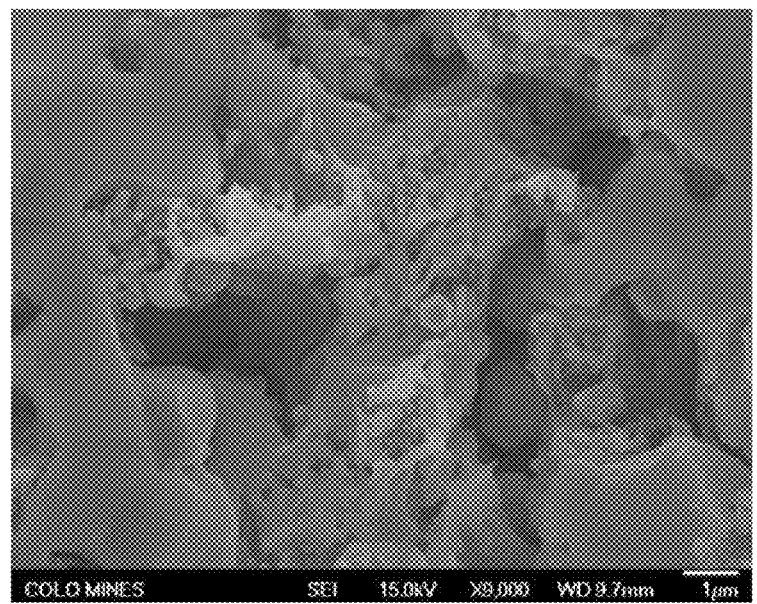

FIGS. 12(a)-(b) show SEM images of the composite cathode microstructure fabricated by infiltration method for PCFC single cell of 45 wt % BCZYYb+55 wt % NiO|BCZYYb+1.0 wt % NiO|BCZY63+BCFZY$_{0.1}$. It is clear that the nanoparticles of BCFZY$_{0.1}$ were successfully deposited on the wall of the porous BCZY63 cathode bone.

Figure 13:
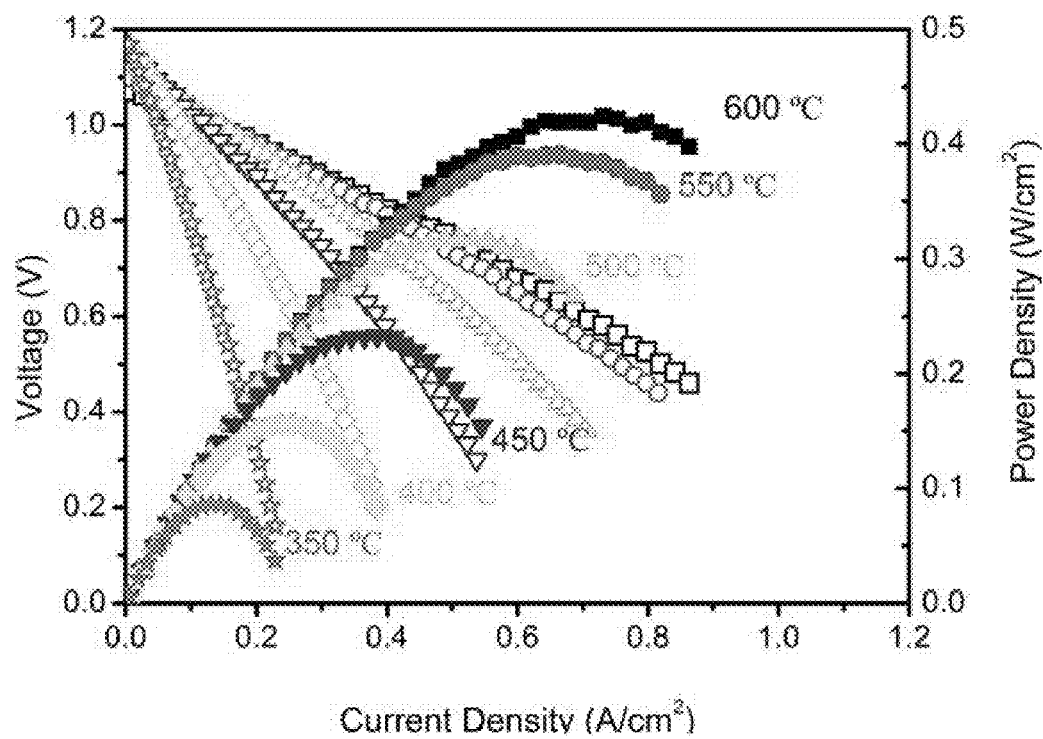
FIG. 13 is a plot of IV curves and corresponding powder densities of a PCFC single cell of 40 wt % BCZY63+60 wt % NiO|NCZY63+1.3 wt % CuO|$BaCo_{0.4}Fe_{0.4}Zr_{0.1}Y_{0.1}O_{3-\delta}$ between 350° C.-600° C. under $H_2$/air operation.

FIG. 13 shows the I-V curves and the corresponding powder densities of a 40 wt. % BCZY63+60 wt. % NiO|BCZY63+1.3 wt. % CuO|BCFZY0.1 cell at 350°-600° C. under H$_2$/Air operation. It is clear that by using the BCFZY$_{0.1}$ thin film cathode excellent power densities were obtained for PCFC single cells at the low operation temperature range of 350-600° C. under H$_2$/air gradient.

Figure 14:
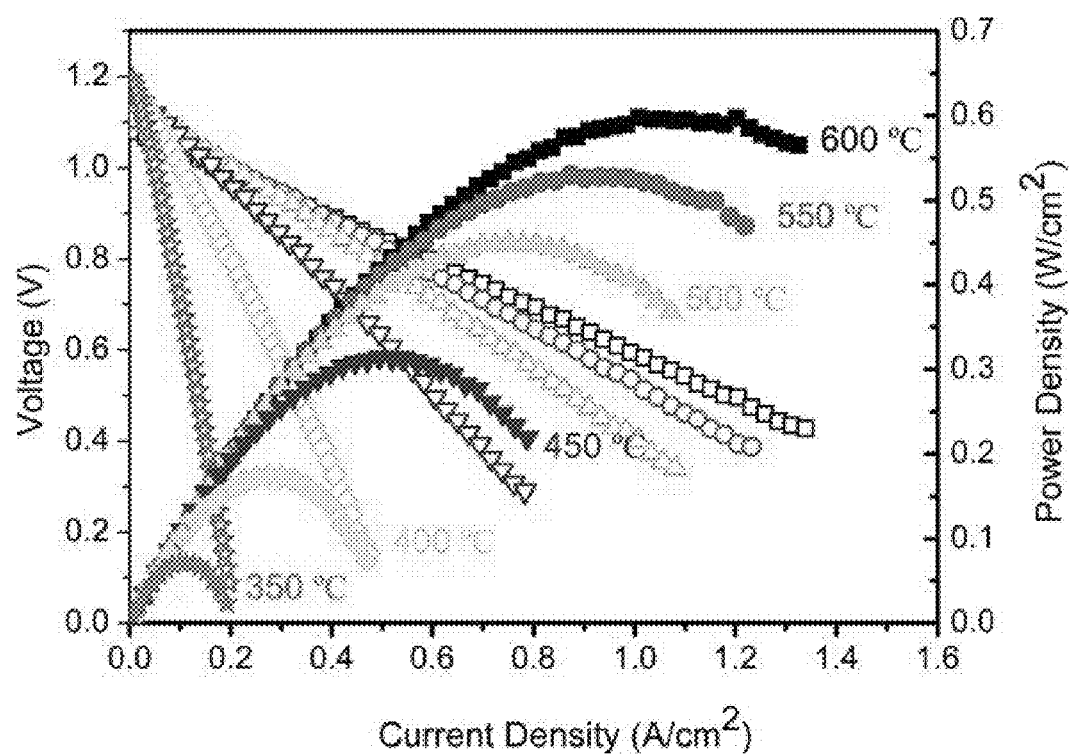
FIG. 14 is a plot of IV curves and corresponding powder densities of a PCFC single cell of 40 wt % BCZYYb+60 wt % NiO|BCZYYB+1.0 wt % NiO|BCZY63+$BaCo_{0.4}Fe_{0.4}Zr_{0.1}Y_{0.1}O_{3-\delta}$ between 350° C.-600° C. under $H_2$/air operation.

FIG. 14 shows the I-V curves and the corresponding powder densities of a 40 wt. % BCZYYb+60 wt. % NiO|BCZYYb+1.0 wt % NiO|BCZY63+BCFZY$_{0.1}$ cell at 350°-600° C. under H$_2$/Air. It is clear that by using BCZY63+BCFZY$_{0.1}$ composites, excellent power densities can be obtained for PCFC single cells at the low operation temperature range of 350-600° C. under H$_2$/air gradient.

Figure 15:
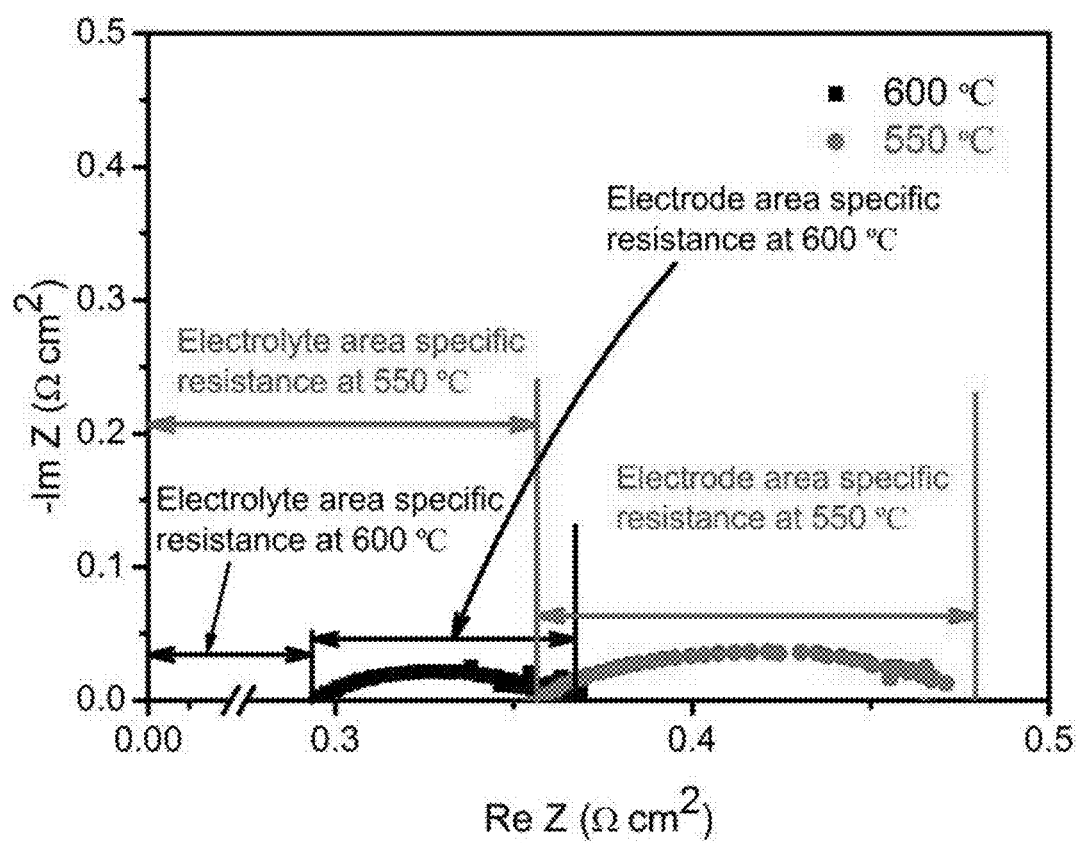
FIG. 15 is a plot of exemplary impedance spectra of 40 wt % BCZYYb+60 wt % NiO|BCZYYb+1.0 wt % NiO|$BaCo_{0.4}Fe_{0.4}Zr_{0.1}Y_{0.1}O_{3-\delta}$.

FIG. 15 shows the impedance spectra of the 40 wt. % BCZYYb+60 wt. % NiO|BCZYYb+1.0 wt % NiO|BCFZY$_{0.1}$ cell (raw impedance data was multiplied by the fuel cell effective area). It is clear that the sum of the ARS values (0.07 Ω·cm$^2$ at 600° C. and 0.12 Ω·cm$^2$ at 500° C.) for the anode and cathode are extremely low, which indicates the excellent cathode performance for the BCFZY$_{0.1}$ cathode.

Accordingly, the present invention has been described with some degree of particularity directed to the exemplary embodiments of the present invention. It should be appreciated though that modifications or changes may be made to the exemplary embodiments of the present invention without departing from the inventive concepts contained herein.

What is claimed is:

1. A cathode for use in a protonic ceramic fuel cell, comprising BaCo$_{0.4}$Fe$_{0.4}$Zr$_{0.2-x}$Y$_x$O$_{3-\delta}$, wherein x is greater than 0 and less than 0.2, and wherein δ is between about 0 and about 0.3.

2. The cathode of claim 1, further comprising a phase-pure perovskite structure.

3. The cathode of claim 1, wherein the cathode is a porous film cathode.

4. The cathode of claim 1, further comprising a cathode bone with a formula of BaCe$_{0.6}$Zr$_{0.3}$Y$_{0.1}$O$_{3-\delta}$.

5. The cathode of claim 4, wherein the BaCo$_{0.4}$Fe$_{0.4}$Zr$_{0.1}$Y$_{0.1}$O$_{3-\delta}$ is a plurality of nanoparticles and wherein the plurality of nanoparticles is deposited on at least one wall of the cathode bone.

6. The cathode of claim 1, wherein a thickness of the cathode is between about 5 and about 70 microns.

7. The cathode of claim 1, wherein the cathode is BaCo$_{0.4}$Fe$_{0.4}$Zr$_{0.1}$Y$_{0.1}$O$_{3-\delta}$.

8. The cathode of claim 1, wherein x is greater than 0 and less than 0.15.

9. A protonic ceramic fuel cell, comprising:
a cathode comprising BaCo$_{0.4}$Fe$_{0.4}$Zr$_{0.2-x}$Y$_x$O$_{3-\delta}$, wherein x is greater than 0 and less than 0.2, and wherein δ is between about 0 and about 0.3;
an electrolyte; and
an anode.

10. The protonic ceramic fuel cell of claim 9, wherein the electrolyte is comprised of at least one of a BaCe$_{0.7}$Zr$_{0.1}$Y$_{0.1}$Yb$_{0.1}$O$_{3-\delta}$-1.0 wt % NiO, a $BaCe_{0.7}Zr_{0.1}Y_{0.1}Yb_{0.1}O_{3-\delta}$-1.0 wt % CoO, a $BaCe_{0.7}Zr_{0.1}Y_{0.1}Yb_{0.1}O_{3-\delta}$-1.0 wt % CuO, a $BaCe_{0.7}Zr_{0.1}Y_{0.1}Yb_{0.1}O_{3-\delta}$-1.0 wt % ZnO, a $BaZr_{0.8}Y_{0.2}O_{3-\delta}$-1.0 wt % NiO, a $BaZr_{0.8}Y_{0.2}O_{3-\delta}$-1.4 wt % CuO, a $BaZr_{0.8}Y_{0.2}O_{3-\delta}$-1.0 wt % CoO, a $BaZr_{0.8}Y_{0.2}O_{3-\delta}$-1.0 wt % ZnO, a $BaCe_{0.6}Zr_{0.3}Y_{0.1}O_{3-\delta}$-1.3 wt % CuO, a $BaCe_{0.6}Zr_{0.3}Y_{0.1}O_{3-\delta}$-1.0 wt % NiO, a $BaCe_{0.6}Zr_{0.3}Y_{0.1}O_{3-\delta}$-1.0 wt % CoO, a $BaCe_{0.6}Zr_{0.3}Y_{0.1}O_{3-\delta}$-1.0 wt % ZnO, a $BaCe_{0.8}Y_{0.2}O_{3-\delta}$-1.0 wt % CoO, a $BaCe_{0.8}Y_{0.2}O_{3-\delta}$-1.0 wt % NiO, $BaCe_{0.8}Y_{0.2}O_{3-\delta}$-1.0 wt % ZnO, and a $BaCe_{0.8}Y_{0.2}O_{3-\delta}$-1.0 wt % CuO.

11. The protonic ceramic fuel cell of claim 9, wherein the anode is comprised of at least one of a $BaCe_{0.7}Zr_{0.1}Y_{0.1}Yb_{0.1}O_{3-\delta}$—Ni, a $BaCe_{0.6}Zr_{0.3}Y_{0.1}O_{3-\delta}$—Ni, a $BaZr_{0.8}Y_{0.2}O_{3-\delta}$—Ni, and a $BaCe_{0.8}Y_{0.2}O_{3-\delta}$—Ni.

12. The protonic fuel cell of claim 9, wherein the cathode s a porous film cathode.

13. The protonic ceramic fuel cell of claim 9, wherein the cathode further comprises a cathode bone with a formula of $BaCe_{0.6}Zr_{0.3}Y_{0.1}O_{3-\delta}$.

14. The protonic ceramic fuel cell of claim 13, wherein the $BaCo_{0.4}Fe_{0.4}Zr_{0.1}Y_{0.1}O_{3-\delta}$ is a plurality of nanoparticles and wherein the plurality of nanoparticles is deposited on at least one wall of the cathode bone.

15. The protonic ceramic fuel cell of claim 9, wherein the cathode further comprises a phase-pure perovskite structure.

16. The protonic ceramic fuel cell of claim 9, wherein the cathode is $BaCo_{0.4}Fe_{0.4}Zr_{0.1}Y_{0.1}O_{3-\delta}$.

17. The protonic ceramic fuel cell of claim 9, wherein a thickness of the cathode is between about 5 and about 70 microns.

18. The protonic ceramic fuel cell of claim 9, wherein the anode comprises at least one of a $BaCe_{0.7}Zr_{0.1}Y_{0.1}Yb_{0.1}O_{3-\delta}$—Ni, a $BaCe_{0.6}Zr_{0.3}Y_{0.1}O_{3-\delta}$—Ni, $BaZr_{0.8}Y_{0.2}O_{3-\delta}$—Ni, and a $BaZr_{0.8}Y_{0.2}O_{3-\delta}$—Ni and the electrolyte comprises at least one a $BaCe_{0.7}Zr_{0.1}Y_{0.1}Yb_{0.1}O_{3-\delta}$-1.0 wt % NiO, a $BaCe_{0.7}Zr_{0.1}Y_{0.1}Yb_{0.1}O_{3-\delta}$-1.0 wt % CoO, a $BaCe_{0.7}Zr_{0.1}Y_{0.1}Yb_{0.1}O_{3-\delta}$-1.0 wt % CuO, a $BaCe_{0.7}Zr_{0.1}Y_{0.1}Yb_{0.1}O_{3-\delta}$-1.0 wt % ZnO, a $BaZr_{0.8}Y_{0.2}O_{3-\delta}$-1.0 wt % NiO, a $BaZr_{0.8}Y_{0.2}O_{3-\delta}$-1.4 wt % CuO, a $BaZr_{0.8}Y_{0.2}O_{3-\delta}$-1.0 wt % CoO, a $BaZr_{0.8}Y_{0.2}O_{3-\delta}$-1.0 wt % ZnO, a $BaCe_{0.6}Zr_{0.3}Y_{0.1}O_{3-\delta}$-1.3 wt % CuO, a $BaCe_{0.6}Zr_{0.3}Y_{0.1}O_{3-\delta}$-1.0 wt % NiO, a $BaCe_{0.6}Zr_{0.3}Y_{0.1}O_{3-\delta}$-1.0 wt % CoO, a $BaCe_{0.6}Zr_{0.3}Y_{0.1}O_{3-\delta}$-1.0 wt % ZnO, a $BaCe_{0.8}Y_{0.2}O_{3-\delta}$-1.0 wt % CoO, a $BaCe_{0.8}Y_{0.2}O_{3-\delta}$-1.0 wt % NiO, $BaCe_{0.8}Y_{0.2}O_{3-\delta}$-1.0 wt % ZnO, and a $BaCe_{0.8}Y_{0.2}O_{3-\delta}$-1.0 wt % CuO.

19. The cathode of claim 9, wherein x is greater than 0 and less than 0.15.

20. The cathode of claim 9 wherein x is 0.1.

\* \* \* \* \*